United States Patent
Johnson et al.

(10) Patent No.: US 9,516,701 B2
(45) Date of Patent: Dec. 6, 2016

(54) WARM WINDOW BUSS BAR SYSTEM AND SAFETY MECHANISM

(71) Applicant: ENERGIZED GLASS, LLC, Timnath, CO (US)

(72) Inventors: Steven X. Johnson, Alameda, CA (US); Dave B. Lundahl, Fort Collins, CO (US)

(73) Assignee: Energized Glass, LLC, Timnath, CO (US)

(*) Notice: Subject to any disclaimer, the term of this patent is extended or adjusted under 35 U.S.C. 154(b) by 231 days.

(21) Appl. No.: 14/189,328

(22) Filed: Feb. 25, 2014

(65) Prior Publication Data

US 2014/0175080 A1 Jun. 26, 2014

Related U.S. Application Data

(60) Division of application No. 14/019,336, filed on Sep. 5, 2013, now Pat. No. 8,669,503, which is a division of application No. 11/969,823, filed on Jan. 4, 2008, now Pat. No. 8,530,793, which is a continuation of (Continued)

(51) Int. Cl.
*H05B 3/06* (2006.01)
*H05B 3/03* (2006.01)

(Continued)

(52) U.S. Cl.
CPC .............. *H05B 3/03* (2013.01); *F24D 13/026* (2013.01); *H05B 3/22* (2013.01); *H05B 3/84* (2013.01); *H05B 2203/016* (2013.01); *Y02B 30/26* (2013.01)

(58) Field of Classification Search
CPC ............ H05B 3/84; H05B 3/00; H05B 3/22; H05B 3/03; H05B 2203/017; H05B 2203/016; F24D 13/026; H02H 5/10; H02H 5/00; F25D 21/04; F25D 21/00; Y10T 29/49083; Y10T 29/49172; Y02B 30/26
See application file for complete search history.

(56) References Cited

U.S. PATENT DOCUMENTS 3,457,594 A 7/1969 Aisanich
3,475,594 A 10/1969 Aisanich (Continued)

FOREIGN PATENT DOCUMENTS

| WO | WO 9927221 | 6/1999 |
| WO | WO 02082466 | 10/2002 |
| WO | WO 03039193 | 5/2003 |

*Primary Examiner* — Shawntina Fuqua
(74) *Attorney, Agent, or Firm* — William W. Cochran; Cochran Freund & Young LLC

(57) ABSTRACT

Disclosed is a warm window system that utilizes individual buss bars that are placed within the space between an inside window pane and an outside window pane and creates sufficient physical force to create an electrical contact on the tin oxide layer on the inside surface of the inside pane of glass. The buss bars have a modulus of elasticity to ensure sufficient electrical contact with the tin oxide layer to prevent the formation of hot spots and securely hold the buss bars in place. Both a z buss bar and c buss bar are also disclosed that are capable of generating a sufficient amount of reactive force to create a secure contact with a tin oxide layer on the interior surface of an interior pane of glass in a warm window system to hold the buss bar in place and provide a large contact surface area to provide sufficient electrical contact with the tin oxide layer to prevent hot spots. A safety circuit is also disclosed that utilizes a controller that generates a control signal to apply the ac power signal to the warm window system in response to a low voltage dc signal that is applied to an isolated strip of conductive material on the inner pane of glass that detects if the glass is broken. The low voltage signal does not provide a shock hazard and safely detects the status of the inner pane of glass.

3 Claims, 28 Drawing Sheets

Related U.S. Application Data application No. 11/422,555, filed on Jun. 6, 2006, now Pat. No. 7,728,260.

(60) Provisional application No. 60/776,472, filed on Feb. 24, 2006, provisional application No. 60/688,398, filed on Jun. 7, 2005.

(51) Int. Cl.
*F24D 13/02* (2006.01)
*H05B 3/84* (2006.01)
*H05B 3/22* (2006.01)

(56) References Cited

U.S. PATENT DOCUMENTS

| | | | |
|---|---|---|---|
| 3,609,293 A * | 9/1971 | Stewart | E06B 3/6715 219/200 |
| 3,710,074 A | 1/1973 | Stewart | |
| 3,720,541 A | 3/1973 | King | |
| 3,760,157 A | 9/1973 | Newman et al. | |
| 3,771,211 A | 11/1973 | Postupack | |
| 3,816,201 A | 6/1974 | Armstrong et al. | |
| 3,863,250 A | 1/1975 | McCluskey, Jr. | |
| 3,876,862 A | 4/1975 | Newman | |
| 3,914,517 A | 10/1975 | Pirooz | |
| 3,941,975 A | 3/1976 | Newman et al. | |
| 4,069,630 A | 1/1978 | Chess | |
| 4,100,398 A | 7/1978 | Levin | |
| 4,278,875 A | 7/1981 | Bain | |
| 4,414,281 A | 11/1983 | Hoda | |
| 4,554,182 A | 11/1985 | Bupp et al. | |
| 4,691,486 A | 9/1987 | Niekrasz et al. | |
| 4,874,550 A | 10/1989 | Prabhu et al. | |
| 4,937,016 A | 6/1990 | Suehiro et al. | |
| 5,143,273 A | 9/1992 | Topel | |
| 5,182,432 A | 1/1993 | Lange et al. | |
| 5,852,284 A | 12/1998 | Teder et al. | |
| 6,144,017 A | 11/2000 | Milett et al. | |
| 6,204,480 B1 | 3/2001 | Woodard et al. | |
| 6,347,175 B1 | 2/2002 | Chen et al. | |
| 7,265,323 B2 | 9/2007 | Gerhardiner et al. | |
| 7,362,491 B2 | 4/2008 | Busick et al. | |
| 2003/0127452 A1 | 7/2003 | Gerhardinger et al. | |
| 2004/0195233 A1 | 10/2004 | Gerhardinger et al. | |
| 2004/0232117 A1 | 11/2004 | Gerhardinger et al. | |
| 2005/0115954 A1 | 6/2005 | Gerhardinger et al. | |
| 2005/0269312 A1 | 12/2005 | Gerhardinger | |
| 2007/0188843 A1 | 8/2007 | Stroumbos et al. | |
| 2007/0259137 A1 | 11/2007 | Busick et al. | |

* cited by examiner

WARM WINDOW BUSS BAR SYSTEM AND SAFETY MECHANISM

CROSS-REFERENCE TO RELATED APPLICATION

This application is a divisional application of U.S. patent application Ser. No. 14/019,336, entitled "Warm Window Buss Bar System and Safety Mechanism," by Steven X. Johnson, et al., filed Sep. 5, 2013, which application is a divisional application of U.S. patent application Ser. No. 11/969,823, entitled "Warm Window Buss Bar System and Safety Mechanism," by Steven X. Johnson, et al., filed Jan. 4, 2008, which application is a continuation-in-part of U.S. patent application Ser. No. 11/422,555, entitled "Warm Window System," by Steven X. Johnson, et al., filed Jun. 6, 2006, which application claims benefit of and priority to U.S. Provisional Patent Application Ser. No. 60/776,472 entitled "Warm Window System" by Steven X. Johnson, filed Feb. 24, 2006, and U.S. Provisional Patent Application Ser. No. 60/688,398 entitled "Warm Window System" by Steven X. Johnson, filed Jun. 7, 2005. The entire contents of the above mentioned applications are hereby specifically incorporated herein by reference for all they disclose and teach.

SUMMARY OF THE INVENTION

An embodiment of the present invention may therefore comprise a warm window system comprising: an outside pane of glass; an inside pane of glass that is coated with a conductive layer over substantially all of a inner surface of said inside pane of glass, the inside pane of glass and the outside pane of glass being arranged substantially parallel and substantially coextensive with each other to form an interior between the inside pane of glass and the outside pane of glass; at least one spacer that is disposed between said inside pane of glass and said outside pane of glass in a peripheral area, said inside pane of glass and said outside pane of glass being substantially aligned so that said inner surface of said inside pane of glass faces an interior portion of said warm window system; at least two buss bars placed in said interior portion of said warm window system adjacent to said at least one spacer, said buss bars comprising: a first base portion that is disposed adjacent to an inside surface of said outside pane; a first arm portion that is connected to said first base portion and forms an acute angle from said first base portion; a second base portion that is disposed adjacent to an inside surface of said outside pane; a second arm portion connected to said second base portion that forms an acute angle between said second base portion; a curved contact surface connected to said first arm portion and said second arm portion that flattens when said buss bar is compressed between said outside pane of glass and said inside pane of glass, said buss bars having a modulus of elasticity that causes said contact surface to be forced against said inner surface of said inside pane of glass, resulting in said contact surface producing a sufficient amount of physical force on said inner surface of said inside pane of glass to create an electrical contact between said contact surface and said conductive layer on said inner surface of said inside pane of glass so that said contact surface is capable of carrying a sufficient current to warm said warm window system, and a sufficient amount of physical force to hold said buss bars in a substantially stationary position in said interior portion of said warm window system.

An embodiment of the present invention may further comprise a method of applying current to a conductive layer in a heated window system comprising: assembling a first pane of glass, having said conductive layer disposed on an inner surface of said first pane of glass, at least one spacer and a second pane of glass, the first pane of glass and the second pane of glass being arranged substantially parallel and substantially coextensive with each other to form an interior between the first pane of glass and the second pane of glass; providing at least two buss bars comprising: a first base portion that is disposed adjacent to an inside surface of said outside pane; a first arm portion that is connected to said first base portion and forms an acute angle from said first base portion; a second base portion that is disposed adjacent to an inside surface of said outside pane; a second arm portion connected to said second base portion that forms an acute angle between said second base portion; said buss bars having a modulus of elasticity that causes said buss bars to produce a sufficient amount of physical force on said conductive layer disposed on said inner surface of said first pane of glass to create an electrical contact between said buss bars and said conductive layer disposed on said inner surface of said first pane of glass that is capable of carrying a sufficient current to warm said heated window system, and a sufficient amount of physical force to hold said buss bars in a substantially stationary position in said heated window system; placing said at least two buss bars between said first pane of glass and said second pane of glass; applying a current to one of said at least two buss bars so that current flows between said at least two buss bars and through said conductive layer.

An embodiment of the present invention may further comprise a warm window system comprising: an outside pane of glass; an inside pane of glass that is coated with a conductive layer over substantially all of an inner surface of said inside pane of glass, the inside pane of glass and the outside pane of glass being arranged substantially parallel and substantially coextensive with each other to form an interior between the inside pane of glass and the outside pane of glass; at least one spacer that is disposed between said inside pane of glass and said outside pane of glass in a peripheral area, said inside pane of glass and said outside pane of glass being substantially aligned so that said inner surface of said inside pane of glass faces an interior portion of said warm window system; at least two buss bars placed in said interior portion of said warm window system adjacent to said at least one space, said buss bars comprising: a first base portion that is disposed adjacent to an inside surface of said outside pane; a second base portion that is disposed adjacent to an inside surface of said outside pane; a curved contact surface connected to said first base portion and said second base portion that flattens when said buss bar is compressed between said outside pane of glass and said inside pane of glass, said buss bars having a modulus of elasticity that causes said contact surface to be forced against said inner surface of said inside pane of glass, resulting in said contact surface producing a sufficient amount of physical force on said inner surface of said inside pane of glass to create an electrical contact between said contact surface and said conductive layer on said inner surface of said inside pane of glass so that said contact surface is capable of carrying a sufficient current to warm said warm window system, and a sufficient amount of physical force to hold said buss bars in a substantially stationary position in said interior portion of said warm window system.

An embodiment of the present invention may further comprise a method of applying current to a conductive layer in a heated window system comprising: assembling a first pane of glass, having said conductive layer disposed on an inner surface of said first pane of glass, at least one spacer and a second pane of glass, the first pane of glass and the second pane of glass being arranged substantially parallel and substantially coextensive with each other to form an interior between the first pane of glass and the second pane of glass; providing at least two buss bars comprising: a first base portion that is disposed adjacent to an inside surface of said outside pane; a second base portion that is disposed adjacent to an inside surface of said outside pane; said buss bars having a modulus of elasticity that causes said buss bars to produce a sufficient amount of physical force on said conductive layer disposed on said inner surface of said first pane of glass to create an electrical contact between said buss bars and said conductive layer disposed on said inner surface of said first pane of glass that is capable of carrying a sufficient current to warm said heated window system, and a sufficient amount of physical force to hold said buss bars in a substantially stationary position in said heated window system; placing said at least two buss bars between said first pane of glass and said second pane of glass, applying a current to one of said at least two buss bars so that current flows between said at least two buss bars and through said conductive layer.

DETAILED DESCRIPTION OF EMBODIMENTS OF THE INVENTION

Figure 1:
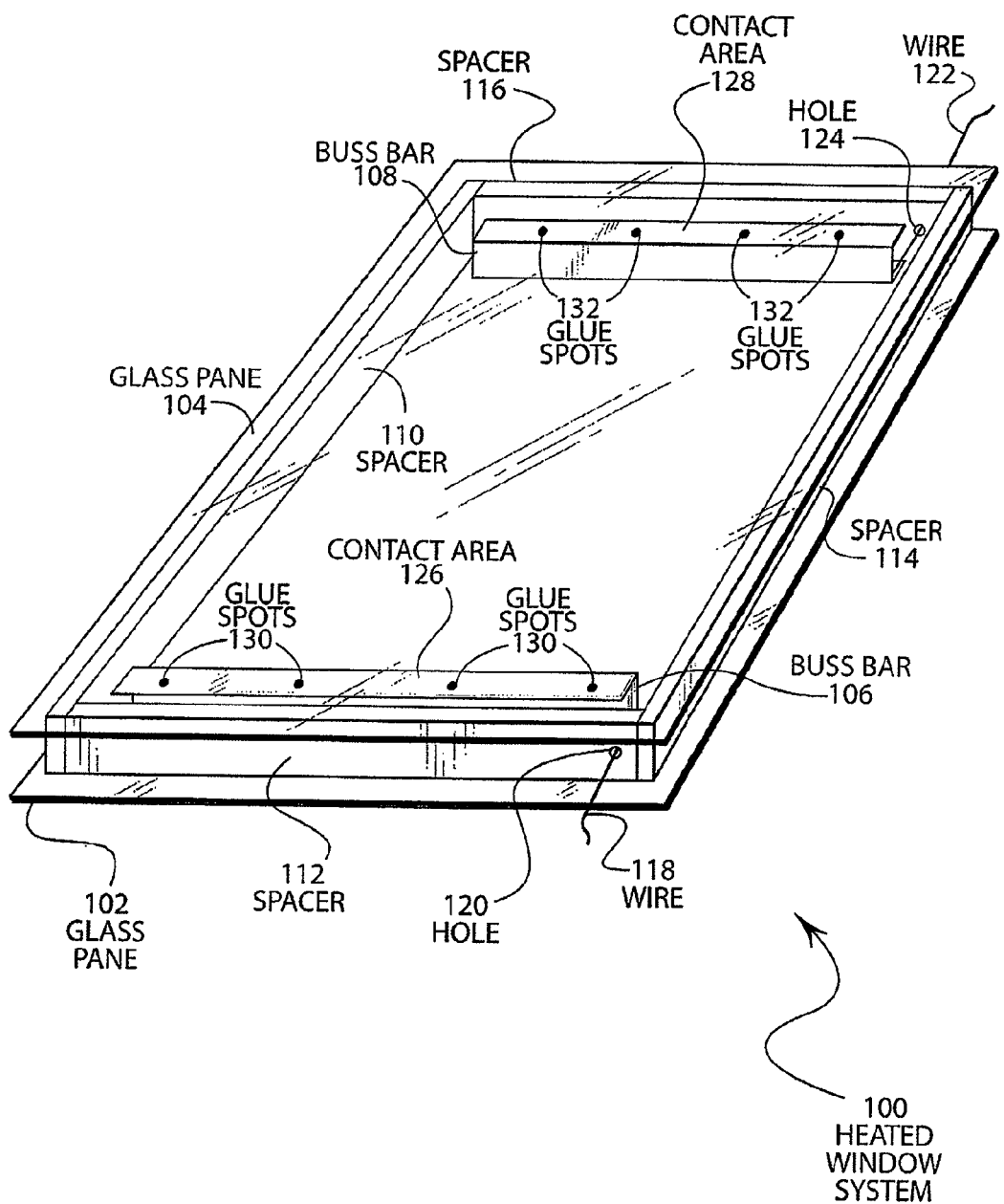
FIG. 1 is an isometric view of one embodiment of a warm window system.

FIG. 1 is an isometric view of one embodiment of a warm window system 100. As shown in FIG. 1, the warm system window 100 includes glass pane 102 and glass pane 104. These glass panes are separated by a plurality of spacers 110, 112, 114, 116. The spacers 110-116 are typical spacers used on double pane glass windows and may provide a hermetic seal between the panes of glass. In addition, spacers 110-116 may constitute a single spacer that is wrapped around the periphery of the window panes. Heat resistant material may be used for spacers 110-116, as well as nonconductive materials.

As also shown in FIG. 1, buss bars 106, 108 are disposed at opposite ends of the window and are connected to wires 118, 122, respectively. Buss bars 106, 108 can comprise any type of conductive material such as copper, beryllium copper alloy, ferris metals or other conductive materials or conductively coated materials. The buss bars 106, 108 are separate pieces that are sized to fit within the space between the glass panes 102, 104. The buss bars 106, 108 fit tightly within the space between the glass panes 102, 104 so that the flange portions of the buss bars 106, 108 contact the inner surfaces of the glass panes 102, 104. The buss bars 106, 108 may or may not be held in place by a conductive, high temperature glue which can be applied at spots 130 on contact area 126 and spots 132 on contact area 128. Buss bars 106, 108 should be made of a material that is sufficiently conductive to transmit a current from wires 118, 122, respectively, to a conductive layer such as a tin oxide layer disposed along the inner surface of glass pane 104, i.e., the surface facing the interior portion of the warm window system 100. A conductive connection should be made in the contact areas 126, 128 between the buss bars 106, 108, respectively, and the conductive layer on the inner surface of the glass pane 104. Hence, the buss bars 106, 108 should be made of a material that is not only conductive, but also has sufficient springiness (i.e., has a modulus of elasticity that is sufficient) to create sufficient pressure at the contact areas 126, 128 to create an electrical contact capable of carrying the desired amount of current and to hold the buss bars in place. The optional glue spots 130, 132 are simply used to further assist in holding the buss bars in place, and are not intended to create the primary electrical contact surface between the flanges of the buss bars 106, 108 and the inner surface of the glass pane 104. Glue spots 130, 132 are not required for operation of the warm window system 100 and are an optional feature that can be included in the design of the system. Wires 118, 122 may be soldered to the inside surface of the buss bars 106, 108, respectively, as disclosed below. Wire 118 passes through hole 120 in spacer 112 to access the buss bar 106. Similarly, wire 122 passes through hole 124 to contact buss bar 108. Holes 120, 122 may be sealed to create a hermetic seal in the warm window system 100.

Figure 2:
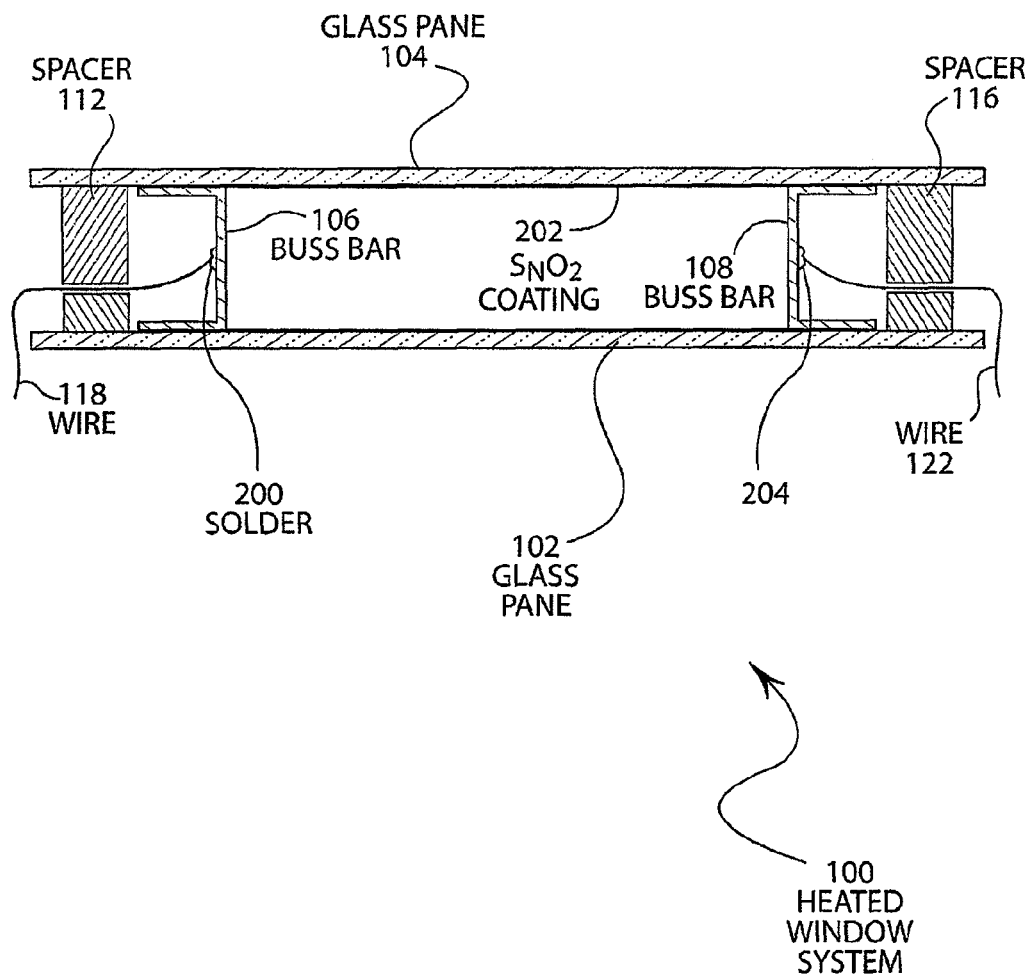
FIG. 2 is a side view of the embodiment of FIG. 1.

FIG. 2 is a side view of the embodiment of the warm window system 100 of FIG. 1. As shown in FIG. 2, glass panes 102, 104 are separated by spacers 112, 116. Buss bars 106, 108 fit tightly between the glass panes 102, 104. Because the tight fit of the buss bars 106, 108 between the glass panes 102, 104, physical pressure is applied between the flanges of the buss bars 106, 108 and the inner surfaces of the glass panes 102, 104. As also shown in FIG. 2, the inner surface of glass pane 104, which may be an outside pane of the warm window system 100, has a tin oxide coating 202. The tin oxide coating may be either a hard coat layer that is formed during the formation of the glass, as is known in the art, or a soft coat layer that is applied by plasma sputtering, or other techniques, onto the inner surface of glass pane 104. The buss bars 106, 108 can be used with either type of conductive coating, such as a tin oxide coating, since the electrical contact between the flanges of the buss bars 106, 108 is made through physical contact, and not by high temperature deposition techniques that are expensive and could damage a soft coat tin oxide layer, or cause glass pane 104 to break, especially if it is made of laminated and/or annealed glass. One advantage of laminated and annealed glass is that it has low distortion. Hence, the buss bars of each of the embodiments disclosed herein can advantageously used with low distortion laminated/annealed glass since the glass does not have to be heated to apply a connection. As further shown in FIG. 2, wire 118 is soldered at solder joint 200 to buss bar 106. Since the solder joint 200 is on the inside of the buss bar 106, it is not visible when looking through the window. Similarly, wire 122 is soldered to buss bar 108 at solder joint 204.

Figure 3:
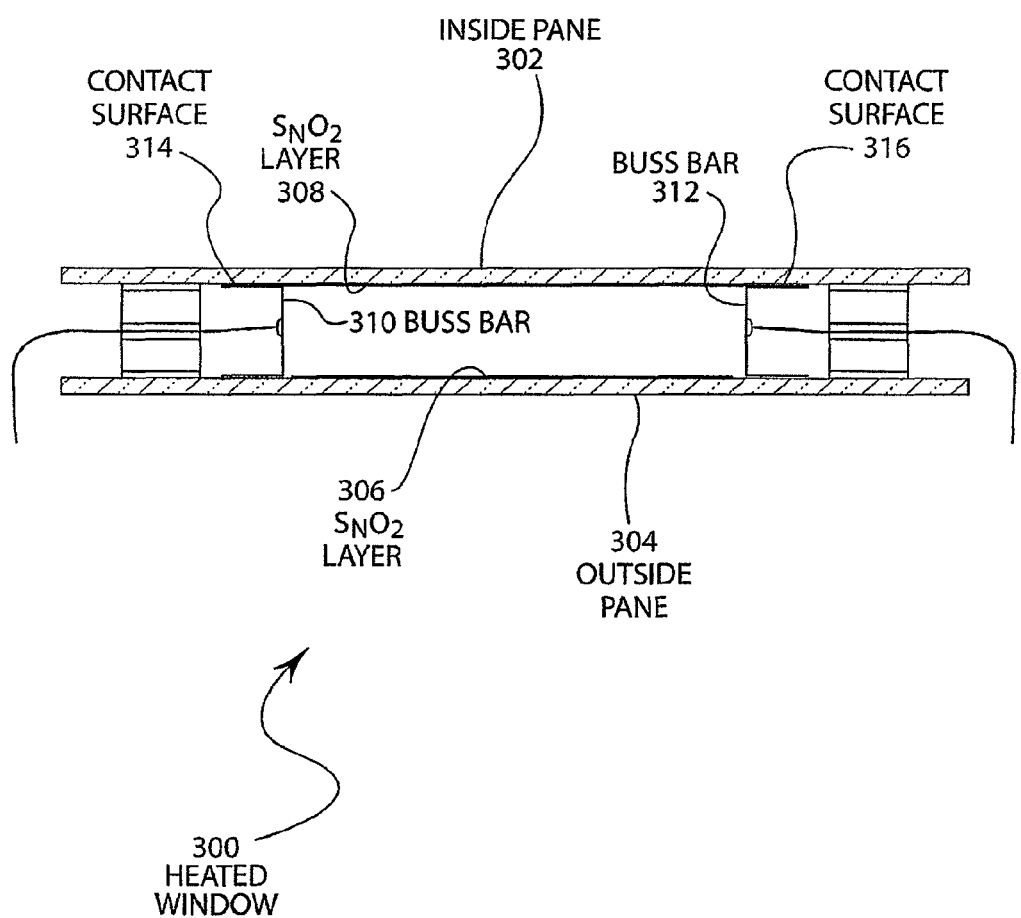
FIG. 3 is a side view of another embodiment of a warm window system.

FIG. 3 is a side view of another embodiment of a warm window system 300. As shown in FIG. 3, the warm window system 300 includes an inside pane of glass 302 and an outside pane of glass 304. In other words, the inside pane 302 faces the interior portion of a dwelling, while the outside pane 304 either faces the outside air or an outside window. Inside pane 302 has a tin oxide layer 308 that extends across the inner surface of inside pane 302. Buss bars 310, 312 include contact surfaces 314, 316, respectively, that contact a conductive layer such as tin oxide layer 308. Electrical current can then flow from buss bar 310 through the contact surface 314 along the tin oxide layer 308 to the contact surface 316 and to the buss bar 312. The resistive nature of the conductive layer, such as a tin oxide layer, causes heat to be generated which is transmitted through the pane 302 to the inside portion of the room. A conductive layer, such as a tin oxide layer 306 or other insulating layer is disposed on the inner surface of the outside pane 304. As shown in FIG. 3, the tin oxide layer 306 does not extend to either buss bar 310 or buss bar 316. Hence, current does not flow through tin oxide layer 306. However, tin oxide layer 306 functions as a reflective layer that reflects the heat generated by tin oxide layer 308 back to inside pane 302 and thereby increases the efficiency of heat that is transmitted through the inside pane 302. Tin oxide layer 306 can be easily coated on the outside pane 304 in the desired locations as a soft coat layer using masking during the plasma sputtering process. Coating of only designated portions of the glass using a hard coat is substantially more difficult but can be done as required. Some soft coat layers may have a insulating coating that is applied over the soft coat layer for protection. This non-conductive protective coating can be removed in the areas where it is desired to have the buss bar make a conductive connection to the soft coat layer using mechanical removal techniques or chemical removal techniques. An advantage of using a tin oxide soft coat layer is that the tin oxide soft coat layer may have a reduced resistively when compared to a tin oxide hard coat layer. The lower resistance of a tin oxide soft coat layer may require lower voltages so that the device can be classified as a class 2 electrical device under UL standards, and is a much safer device. For example, standard hard coat layers may have a resistivity of 10 to 15 ohms per square, whereas the soft coat product may only have 2 ohms per square.

Figure 4:
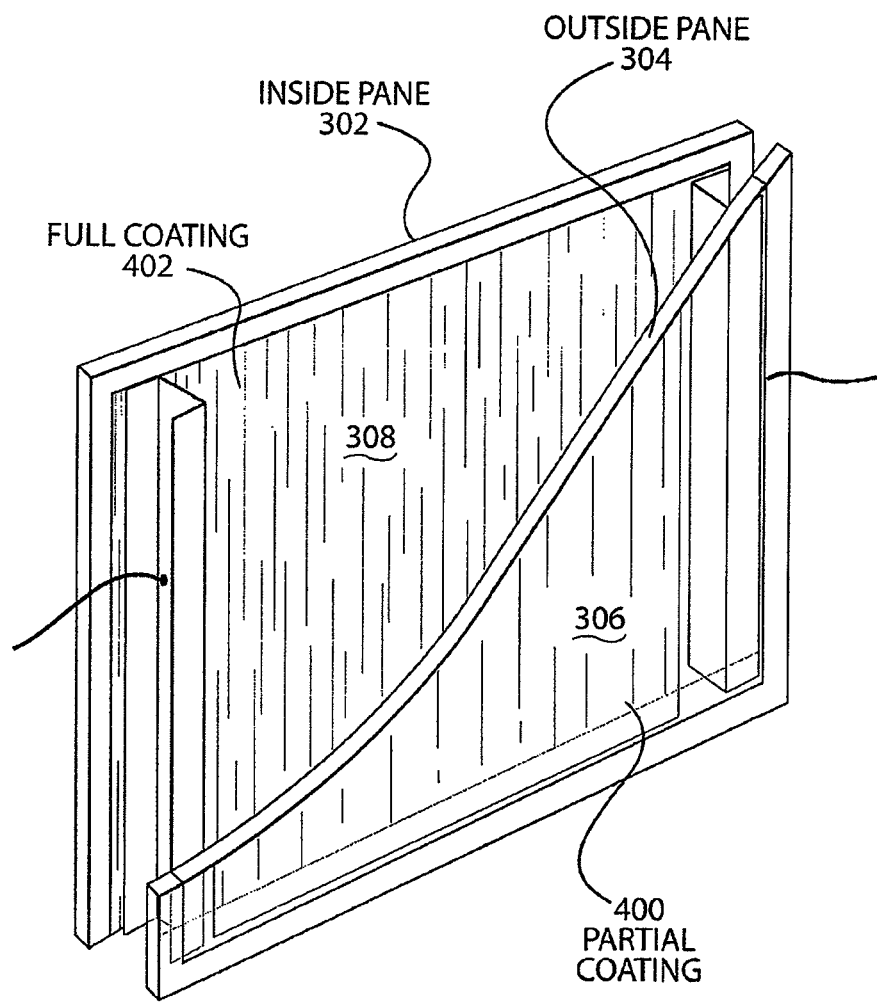
FIG. 4 is an isometric cutaway view of the embodiment of FIG. 3.

FIG. 4 is an isometric cutaway view of the embodiment of FIG. 3. FIG. 4 illustrates the partial coating 400 of the outside pane using a soft coat tin oxide layer 306 and a full coating 402 of the inside pane 302 with a hard coat tin oxide layer 308.

Figure 5:
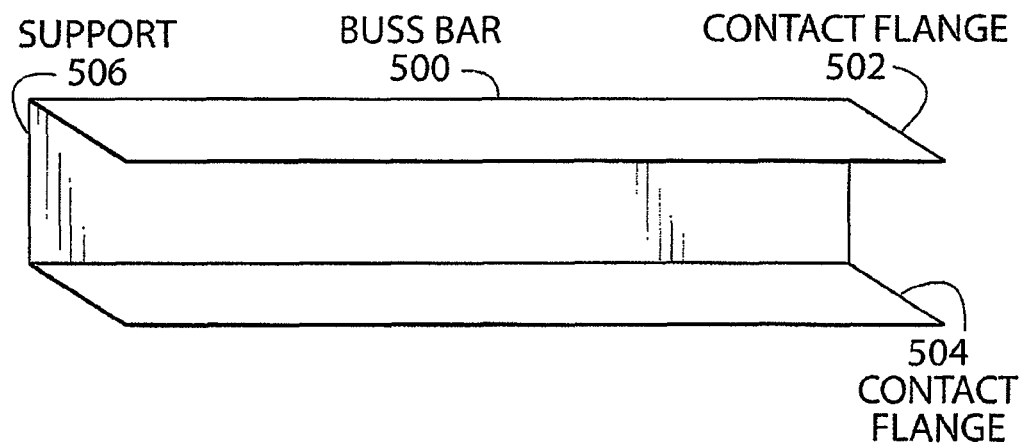
FIG. 5 is an isometric view of one embodiment of a buss bar.

FIG. 5 is an isometric view of one embodiment of a buss bar 500. As shown in FIG. 5, the buss bar has a contact flange 502 and another contact flange 504. The contact flanges are connected to a support 506 that maintains the structural rigidity of the buss bar 500. The buss bar 500 can be made of a semi-malleable metal that is highly conductive such as copper or other conductive materials, as disclosed above. The buss bar 500 should be made of a metal that has sufficient rigidity and a sufficient modulus of elasticity to maintain electrical contact on the contact flange 502. If additional elasticity is required, alloys of copper can be used such as a copper beryllium alloy or other alloys. Additionally, the contact flange can be made of a highly conductive material, while the support 506 and contact flange 504 can be made of a more rigid material. Various other alloys can provide additional elasticity while maintaining a high electrical conductivity.

Figure 6:
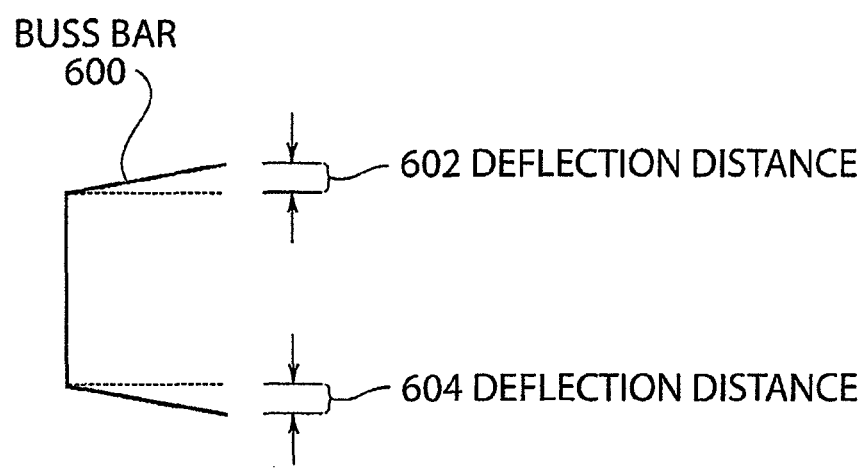
FIG. 6 is a side view of another embodiment of a buss bar.

FIG. 6 is a side view of another embodiment of a buss bar 600. As shown in FIG. 6, the flanges 606, 608 can be disposed at deflection distances 602, 604. The deflection distances 602, 604 allow the flanges 606, 608 to be deflected and apply physical force to the inside of the glass panes to ensure adequate electrical contact. Elasticity of the metal of the buss bar 600 should be sufficient to allow the deflection of the deflection distances 602, 604 of the flanges 606, 608, respectively, to prevent deformation or breaking of the flanges 606, 608. A proper modulus of elasticity also ensures physical contact with the inside of the glass panes.

Figure 7:
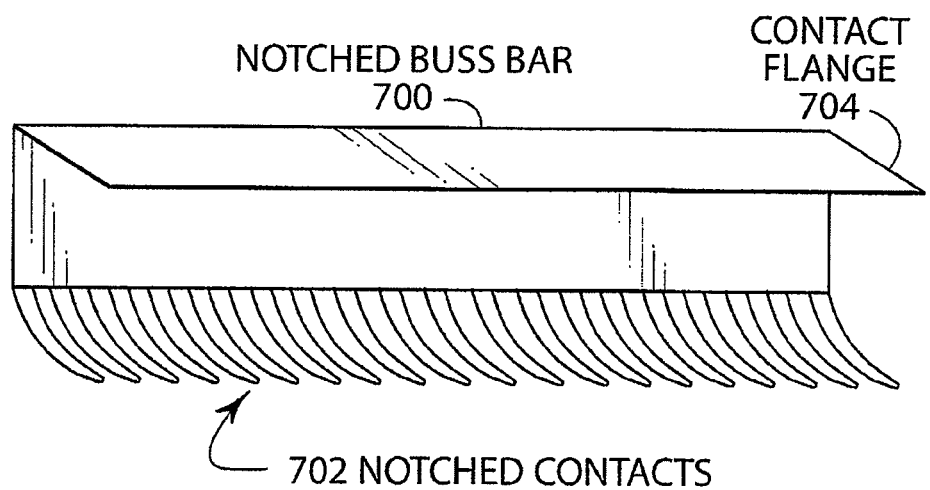
FIG. 7 is an isometric view of another embodiment of a buss bar.

FIG. 7 is an isometric view of another embodiment of a buss bar 700. As shown in FIG. 7, contact flange 704 is the contact flange that does not touch a tin oxide layer. In other words, contact flange 704 is the contact flange that contacts the outside pane of glass, such as outside pane 304 in FIG. 3. The other flange of the notched buss bar 700 has been notched to form notched contacts 702. The notched contacts 702 are similar to a plurality of leaves that individually contact the conductive layer on the inside surface of the inside pane of glass. By providing individual notched contacts, a deflection of any one notched contact does not affect an adjacent notched contact. In other words, each of the notched contacts operates in an independent fashion to contact the tin oxide layer to maximize the contact surfaces.

Figure 8:
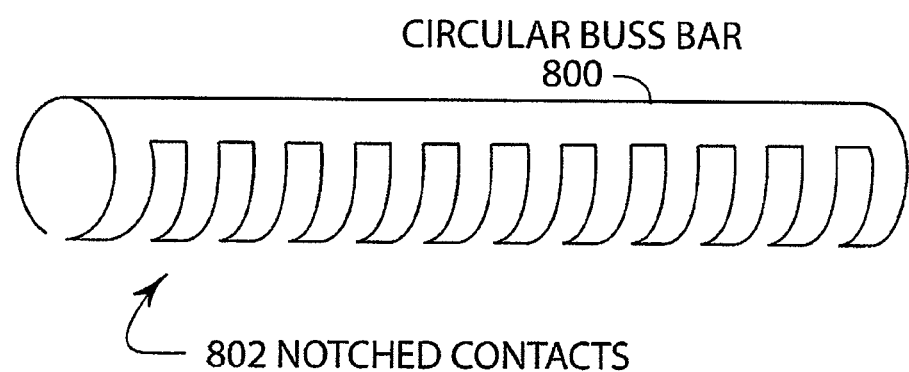
FIG. 8 is an isometric view of another embodiment of a buss bar.

FIG. 8 is an isometric view of another embodiment that comprises a circular buss bar 800. As shown in FIG. 8, a series of notched contacts 802 are formed in the circular buss bar that function independently to contact the tin oxide layer on the inside surface of the inside pane of glass. Again, each of the notched contacts 802 functions independently to provide a plurality of contact surfaces.

Figure 9:
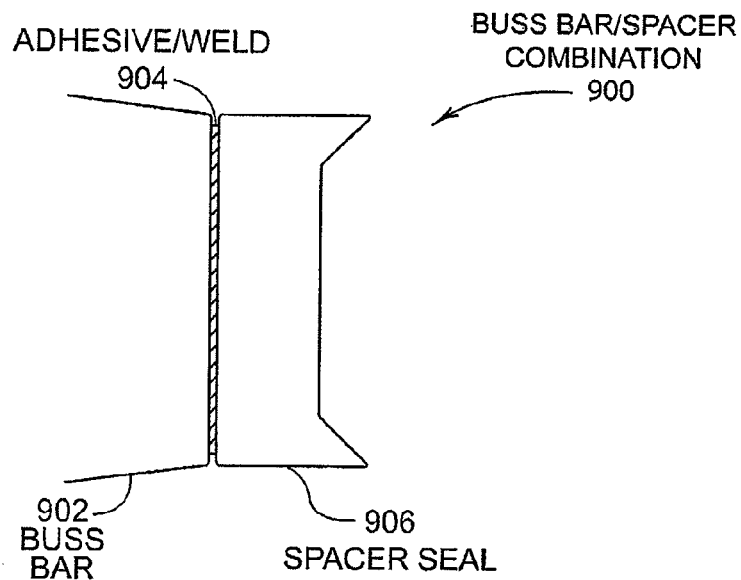
FIG. 9 is a side view of another embodiment of a buss bar and spacer seal.

FIG. 9 is a side view of a buss bar/spacer combination 900. As shown in FIG. 9, the combination includes a buss bar 902 and a spacer seal 906 that are attached by an adhesive or a weld 904. For example, adhesive 904 can comprise a high temperature adhesive. Weld 904 may comprise an ultrasonic weld using a spacer seal material that melts at high temperatures. In this fashion, heat generated in the buss bar 902 will not affect the weld 904. Any other method of welding the buss bar 902 to the spacer seal 906 can be used. In addition, the buss bar 902 can form an integral part of the spacer seal 906. For example, the spacer seal 906 may be formed so that the spacer seal has a conductive flange that is incorporated as part of the spacer seal 906 that is placed adjacent to the tin oxide layer on the inside surface of the inside pane. The spacer seal 906 may be made of high temperature plastic that is coated with a metalized layer having a flange to which a wire can be soldered, or the wire may be soldered directly to the body of the spacer.

Figure 10:
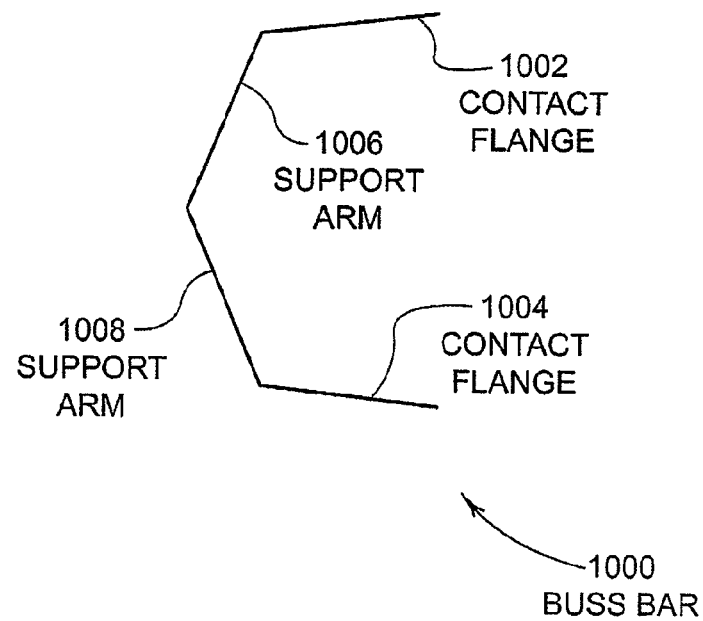
FIG. 10 is a side view of another embodiment of a buss bar.

FIG. 10 is a side view of another embodiment of a buss bar 1000. As shown in FIG. 10, buss bar 1000 includes a contact flange 1002, another contact flange 1004, a support arm 1006 and another support arm 1008. Again, contact flanges 1002, 1004 are fabricated so that the flanges extend in an outward direction and can be deflected to ensure physical and electrical contact. Further, support arms 1006, 1008 are disposed at an angle and may provide further deflection to further increase physical and electrical contact characteristics.

Figure 11:
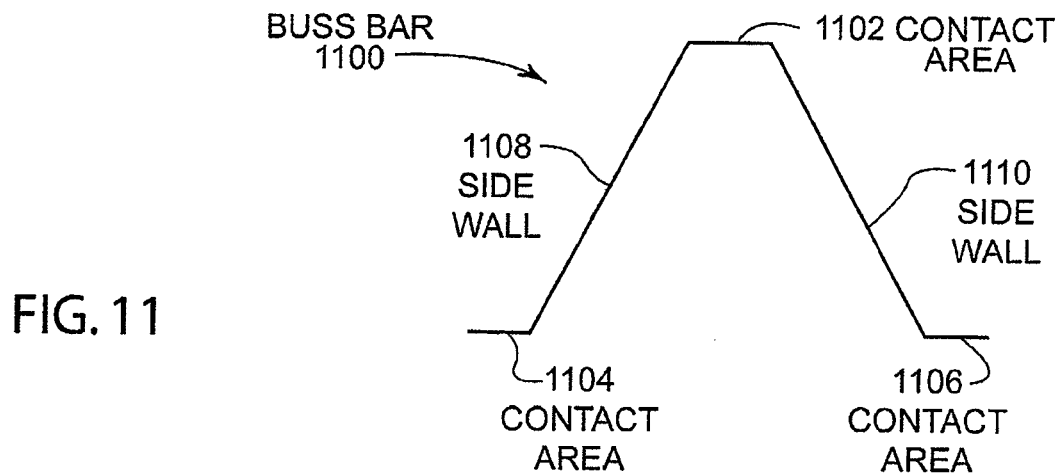
FIG. 11 is a side view of another embodiment of a buss bar.

FIG. 11 is a side view of another embodiment of a buss bar 1100. As shown in FIG. 11, buss bar 1100 has a top contact area 1102 and two bottom contact areas 1104, 1106. Sidewalls 1108, 1110 support the contact areas and provide sufficient rigidity to ensure that sufficient physical and electrical contact is made by the contact areas 1102, 1104, 1106.

Figure 12:
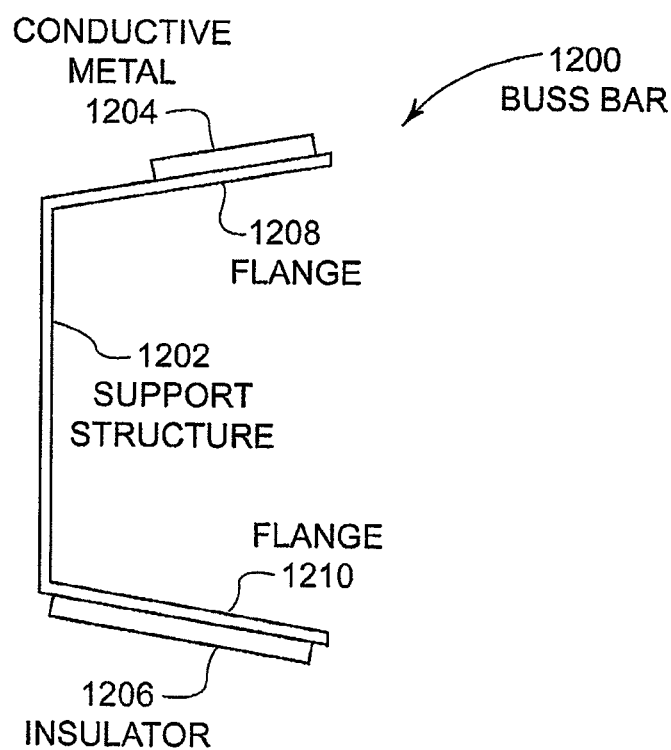
FIG. 12 is a side view of another embodiment of a buss bar.

FIG. 12 is a side view of another embodiment of a buss bar 1200. Referring again to FIG. 3, outside pane 302 is coated with a conductive layer such as a tin oxide layer 308. The tin oxide layer 308 can be a soft coat layer or may comprise a hard coat layer. Similarly, outside pane 304 includes a conductive layer such as tin oxide layer 306 that also may comprise a hard coat or soft coat layer. Inside pane 302 is coated along the entire inside surface with the tin oxide layer 308. In contrast, outside pane 304 is coated only on a portion of the inside surface of the outside pane 304. It may be desirable in many instances to use inside panes and outside panes that are both coated over the entire surface for the purposes of ease of fabrication and assembly, and other reasons. Although it may be desirable to apply current to both tin oxide layers on both the inside of the inside pane and the inside of the outside pane, in most instances it is not desirable. Referring again to FIG. 12, the buss bar 1200 comprises a support structure 1202 that has a conductive metal 1204 disposed on flange 1208, and an insulator 1206 that is disposed on flange 1210 of support structure 1202. The support structure 1202 can be made of a spring type material that has a modulus of elasticity that is sufficient to create adequate physical and electrical contacts on the inside surfaces of the panes of glass. Insulator 1206 insulates the buss bar 1200 so that electrical current does not flow through the tin oxide layer on the outside pane of glass that is adjacent to insulator 1206. Alternatively, support structure 1202 can be made of an insulating material that can be coated with a conductive metal 1204. In that embodiment, the insulator 1206 can be removed.

Figure 13:
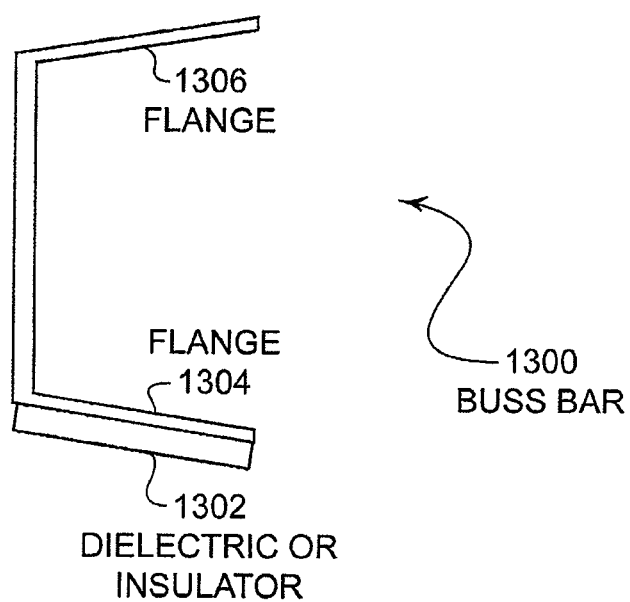
FIG. 13 is a side view of another embodiment of a buss bar.

FIG. 13 is a side view of another embodiment of a buss bar 1300. As shown in FIG. 13, buss bar 1300 includes a flange 1304 with a dielectric or insulator coating 1302 disposed on the outside surface. The buss bar 1300 is made of a conductive material so that the flange 1306 makes electrical contact with the conductive layer on the inside surface of the inside pane of glass. The dielectric or insulator coating 1302 prevents electrical contact of the buss bar 1300 with the conductive layer that covers the inside surface of the outside pane so that no electrical current flows through the conductive layer on the outside pane.

Figure 14:
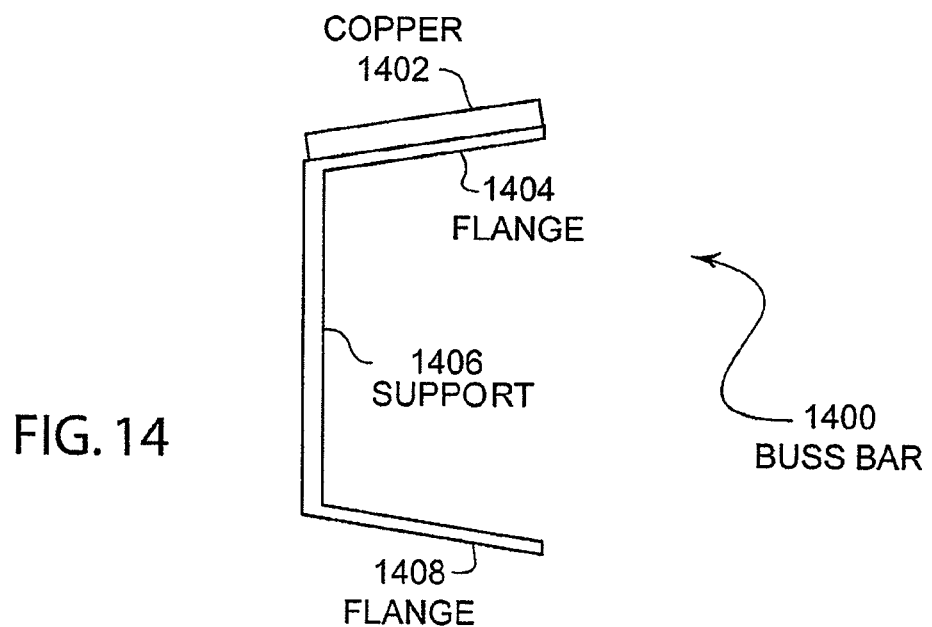
FIG. 14 is a side view of another embodiment of a buss bar.

FIG. 14 is a side view illustrating another embodiment of a buss bar 1400. As shown in FIG. 14, buss bar 1400 has a copper layer 1402 or other conductive metal layer disposed on flange 1404 which is made of an insulating material, as well as support 1406 and flange 1408. The buss bar 1400, that is illustrated in FIG. 14, can have a supporting structure that is made of any desired type of insulating material on which a metalized layer 1402 can be disposed, and which has a modulus of elasticity that ensures adequate physical and electrical contact.

Figure 15:
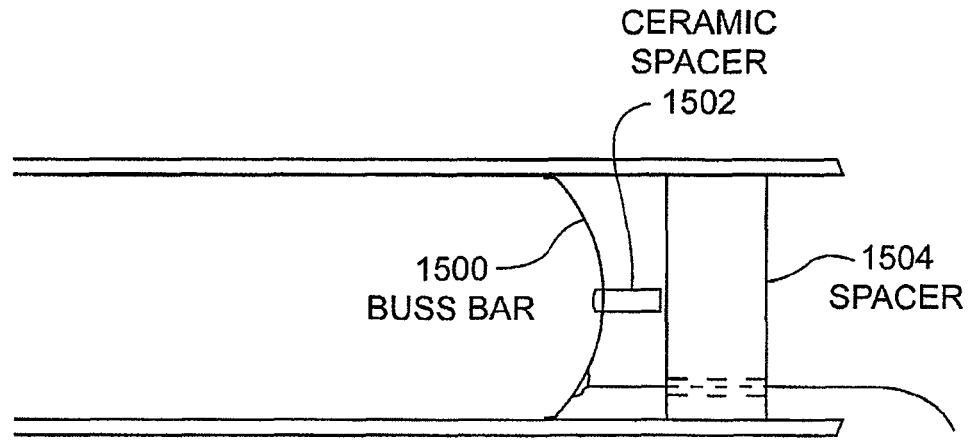
FIG. 15 is a side view of another embodiment of a buss bar disposed in a window system.

FIG. 15 is a side view of another embodiment of a buss bar 1500 disposed in a warm window system. As shown in FIG. 15, buss bar 1500 has a ceramic spacer 1502 that separates the buss bar 1500 from spacer 1504. Ceramic spacer 1502 has low heat conductivity so that heat is not transferred from the buss bar 1500 to the spacer 1504.

Figure 16:
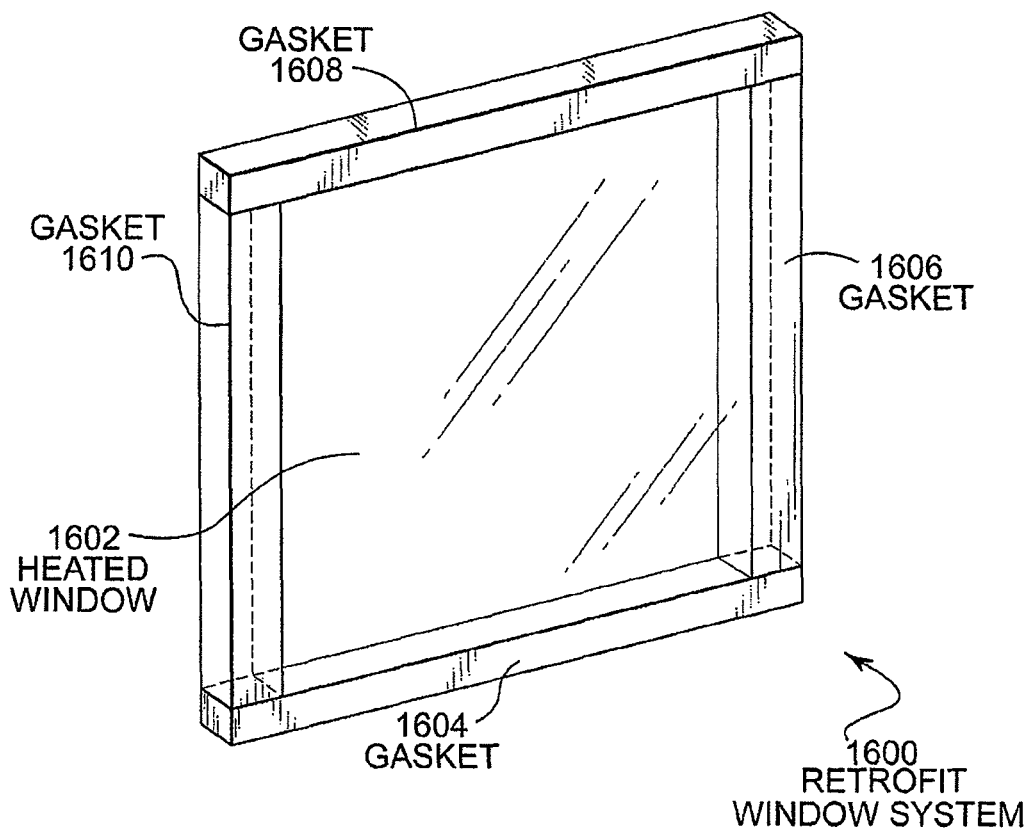
FIG. 16 is an isometric view of a retrofit warm window system.

FIG. 16 is a perspective view of another embodiment showing a retrofit window system 1600. The retrofit window system 1600 uses a plurality of gaskets 1604, 1606, 1608, 1610 that are used to surround the warm window 1602. The retrofit window system 1600 can be placed on flat surfaces surrounding the inside of a window to provide a sealed retrofit window system that does not affect the outside window system. A properly sized window warm window system 1602 can be selected together with compressible gaskets 1604-1610 so that a sealed system can be retrofit into an area surrounding an outside window and provide an airtight fit around the area surrounding the outside window. The system can be held in place by clips (not shown), adhesive or any desired means. The retrofit window system 1600 substantially increases the R value of the entire window system including the outside window and blocks cold that would otherwise normally be transmitted in cold climates through the outside window. There are many applications where a warm window system that blocks cold transmitted by normal windows is desirable such as in hospitals, nursing homes and other applications. External plug-ins can be provided at the edge of the warm window 1602 so that the retrofit window system 1600 can be easily adapted and plugged into a standard wall outlet. Hardwired internal connections can also be made.

Figure 17:
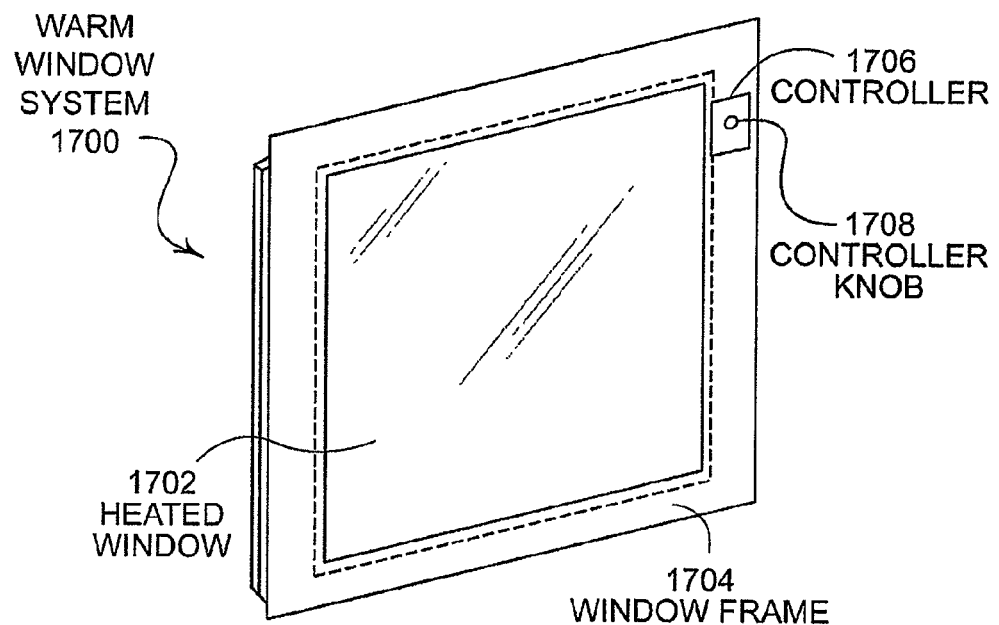
FIG. 17 is an isometric view of another embodiment of a warm window system.

FIG. 17 illustrates another embodiment of a warm window system 1700. As shown in FIG. 17, the warm window 1702 is surrounded by a window frame 1704. A controller 1706 can be mounted on the window frame which controls the amount of current that is applied to the warm window 1702. The controller 1706 includes a controller knob 1708 which can be used to control the amount of current and hence, the heat generated by the warm window 1702. The controller 1706 can also be mounted in the glass of the warm window system 1702 together with a plug, as disclosed with respect to the description of FIG. 16. Internal connections can also be made.

Figure 18:
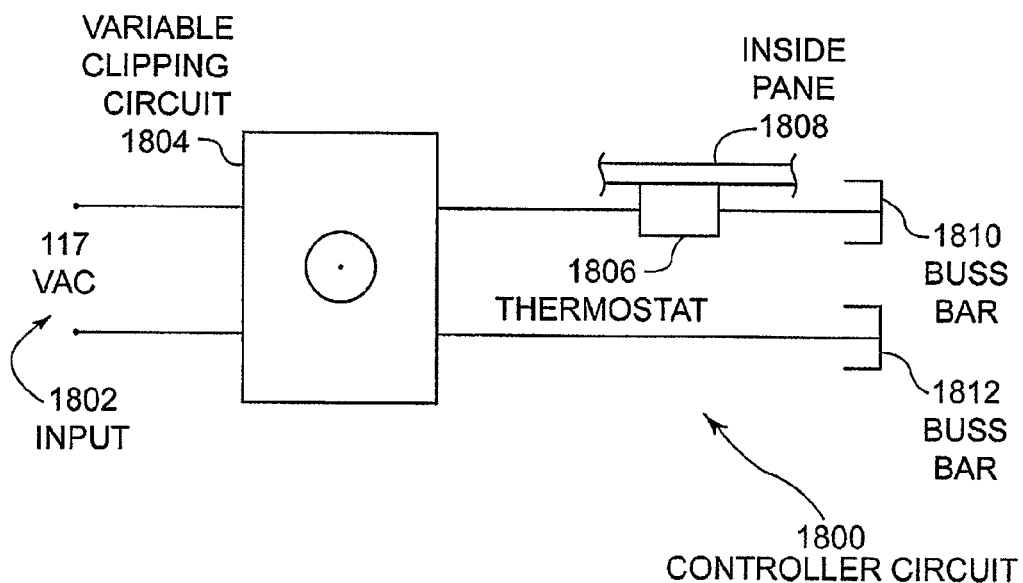
FIG. 18 is a schematic block diagram of a controller circuit.

FIG. 18 is a schematic block diagram of a control circuit for controlling the amount of current that is applied to the conductive layer via the buss bars. As shown in FIG. 18, a standard 117 volt AC signal 1802 is applied to a variable clipping circuit 1804. The variable clipping circuit is specifically designed to deliver an amount of power to the window that is consistent with the power used by the warm window system. For example, the warm windows generally use up to 25 watts per square foot of electrical power. A variable clipping system 1804 can therefore be selected for the particular size window that is utilized in the warm window system so that clipping circuit 1804 does not deliver more power than the maximum that can be used by the warm window system. The variable clipping circuit 1804 essentially clips the output sinusoidal signal to vary the amount of current applied. The output of the variable clipping circuit 1804 is applied to a thermostat 1806 that may be placed in contact with the inside surface of the inside pane 1808. Thermostat 1806 creates an open circuit whenever the temperature of the inside pane 1808 exceeds a predetermined temperature. The thermostat can be selected to create an open circuit at a desired temperature. For example, the thermostat may create the open circuit and stop the supply of power to the buss bar 1810 when the temperature reaches 110 degrees. The other output of the variable clipping circuit 1804 is connected to buss bar 1812. In this fashion, the thermostat provides a fail safe system for ensuring that the current, and therefore the power, delivered to the warm window system does not exceed an amount that would cause the window to overheat and cause damage to the warm window system. A transformer can also be provided to lower the voltage.

Figure 19:
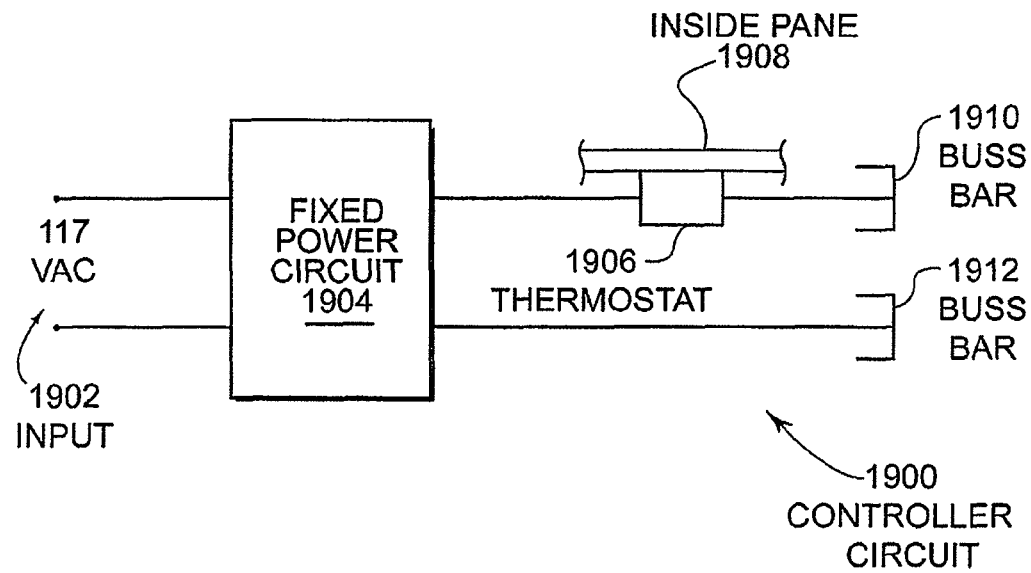
FIG. 19 is a schematic block diagram of another embodiment of a controller circuit.

FIG. 19 is an alternative embodiment of a controller circuit 1900. As shown in FIG. 19, an input AC voltage signal 1902 is applied to a fixed power circuit 1904. Fixed power circuit 1904 delivers a preset power output that is applied to thermostat 1906 and buss bars 1910, 1912. The preset power output produced by the fixed power circuit 1904 is designed for a particular size window. For example, it may be desirable to deliver 22 watts per square foot of warm space on a window. Hence, different fixed power circuits 1904 could be used for different size windows having different size warm surfaces. Thermostat 1906 is placed adjacent the inside panel 1908 and determines the temperature generated on the inside panel 1908. By selecting the fixed power circuit 1904 to deliver an optimal amount of power to the conductive layer on the inside panel 1908 for various environmental conditions, thermostat 1906 will turn on and off at a preset temperature such as 110 degrees. In very cold conditions, thermostat 1906 may stay on at all times since the full amount of power from the fixed power circuit 1904 will need to be delivered to the inside pane 1908. If the outside temperature is warmer, thermostat 1906 may periodically switch on and off to control the temperature level of the inside pane in a desired range, for example, around 110 degrees Fahrenheit. In this fashion, the thermostat 1906 is capable of maintaining a desired temperature on the inside pane 1908 within a specific range of temperatures using a fixed power control 1904 that requires no adjustment. The fixed power control circuit 1904 can deliver either AC or DC power, as desired.

Figure 20:
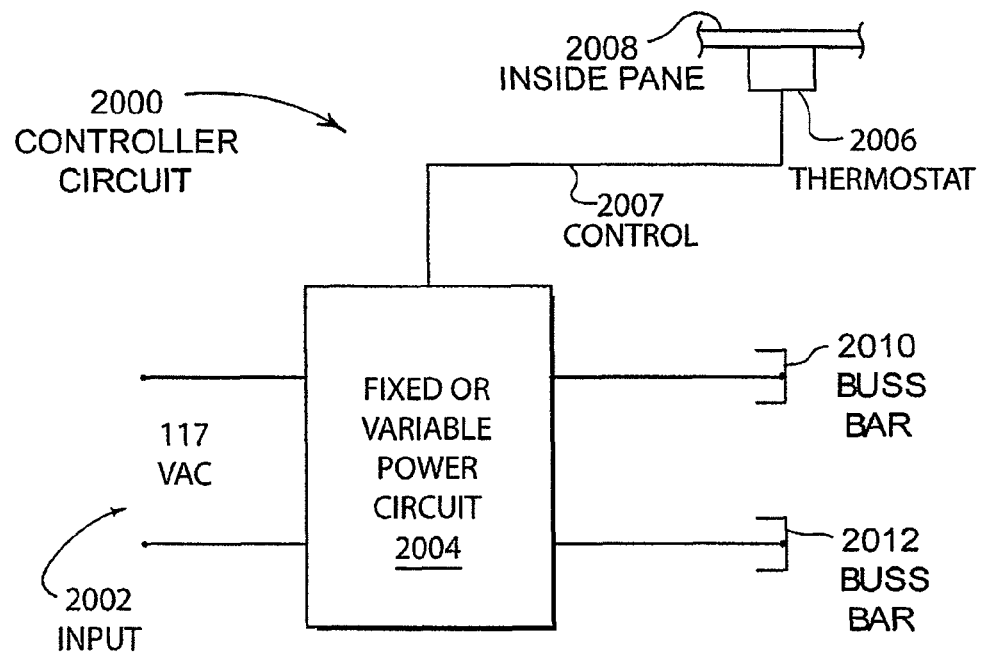
FIG. 20 is a schematic block diagram of another embodiment of a controller circuit.

FIG. 20 is a schematic block diagram of another embodiment of a controller circuit 2000. As shown in FIG. 20, input 2002 delivers 117 volts AC electrical power to the fixed or variable power control circuit 1204. The output of the fixed or variable power circuit 2004 is applied to buss bars 2010, 2012 which deliver current to the warm window system. Thermostat 2006 is placed adjacent the inside pane 2008 and generates a control signal 2007 that is applied to the fixed or variable power control circuit 2004. In this fashion, the thermostat 2006 controls the fixed or variable power circuit 2004 and does not comprise a switch for the electrical power that is delivered to the window system. Various types of thermostats can be used including ceramic devices that are capable of a high number of switching cycles so that the controller circuit 2000 is capable of an extended lifetime. The fixed or variable power circuit 2004 can operate in the manner described in FIG. 19 or FIG. 18, respectively.

Figure 21:
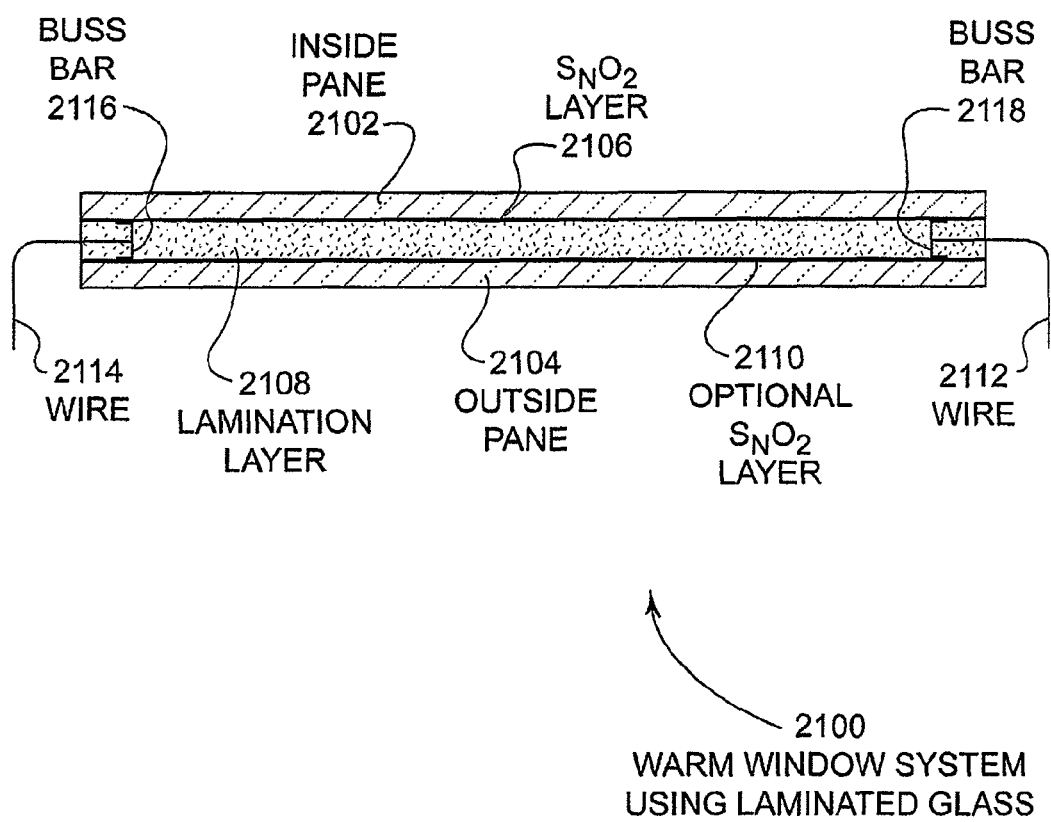
FIG. 21 is a side view of an embodiment of a warm window system using laminated glass.

FIG. 21 is a side view of another embodiment of a warm window system 2100 using laminated and/or annealed glass. As shown in FIG. 21, the laminated glass and/or annealed system utilizes an inside pane 2102 and an outside pane 2104. The inside pane 2102 has a conductive layer such as tin oxide layer 2106 deposited on the inner portion of the warm window system 2100. An optional insulating layer, such as a tin oxide layer 2110 can be disposed on the inner surface of the outside pane 2104. The optional tin oxide layer 2110 may cover only a portion of the inner surface of the outside pane 2104 to avoid contact with buss bar 2116 and buss bar 2118, or may cover the entire inner surface of the outside pane 2104 with insulation layers or other insulating material used on buss bar 2116 and buss bar 2118 to prevent an electrical circuit between the buss bars 2116, 2118 on the outside pane 2104. Alternatively, it may be desirable to heat the outside pane 2104 to melt ice or perform other functions. Hence, a contact may be desirable on the optional tin oxide layer 2110 between buss bar 2116 and buss bar 2118.

Figure 22:
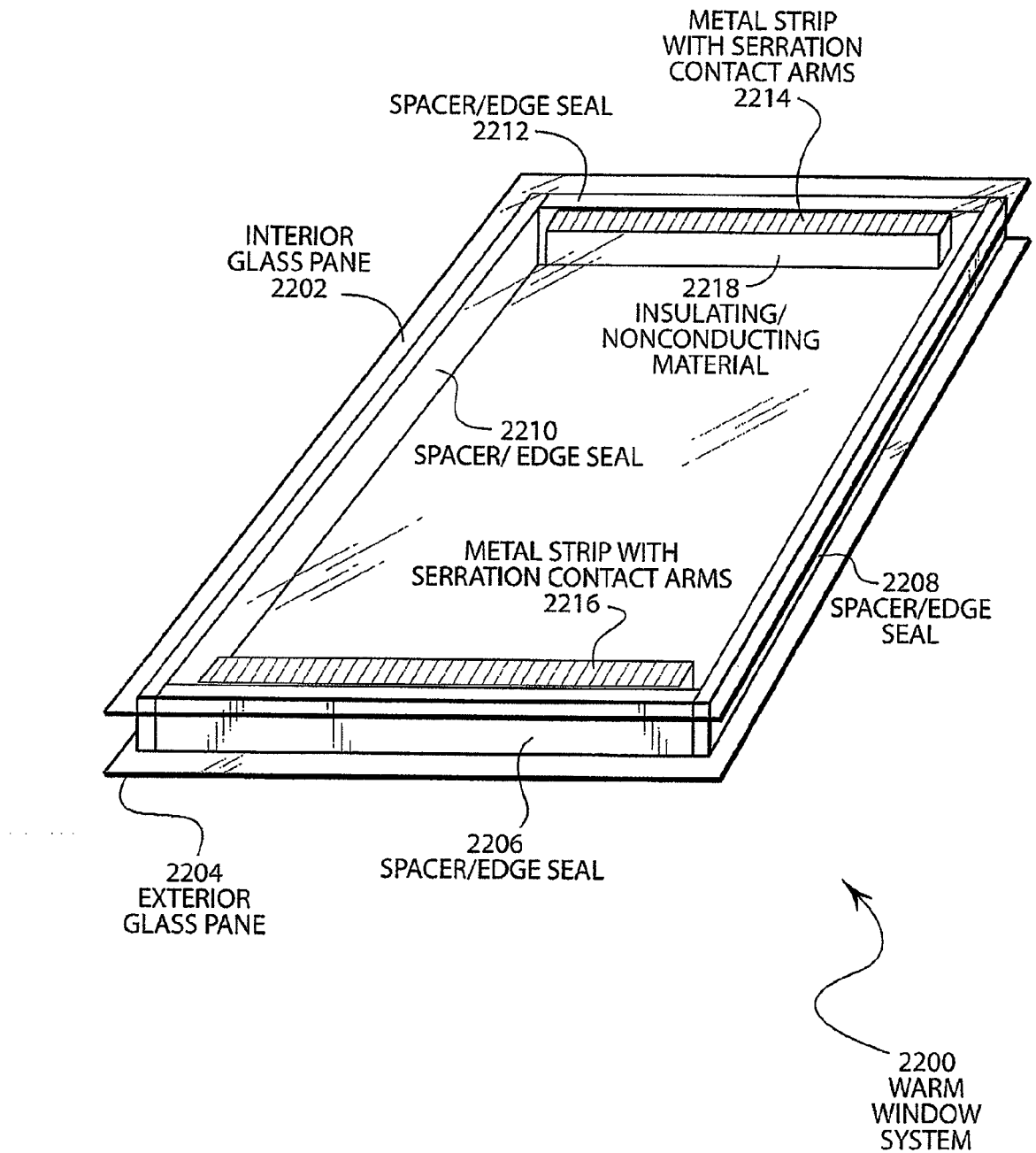
FIG. 22 is an isometric view of another embodiment of a warm window system.

FIG. 22 is an isometric view of one embodiment of a warm window system 2200. As shown in FIG. 22, the warm window system 2200 includes an interior glass pane 2202 and an exterior glass pane 2204. These glass panes are separated by a plurality of spacers 2206, 2208, 2210, 2212. The spacers 2206-2212 are typical spacers that are used on double pane glass windows and may provide a hermetic seal between the panes of glass. In addition, spacers 2206-2212 may constitute a single spacer that is wrapped around the periphery of the window panes. Heat resistant material may be used for spacers 2206-2212, as well as nonconductive materials.

Figure 23:
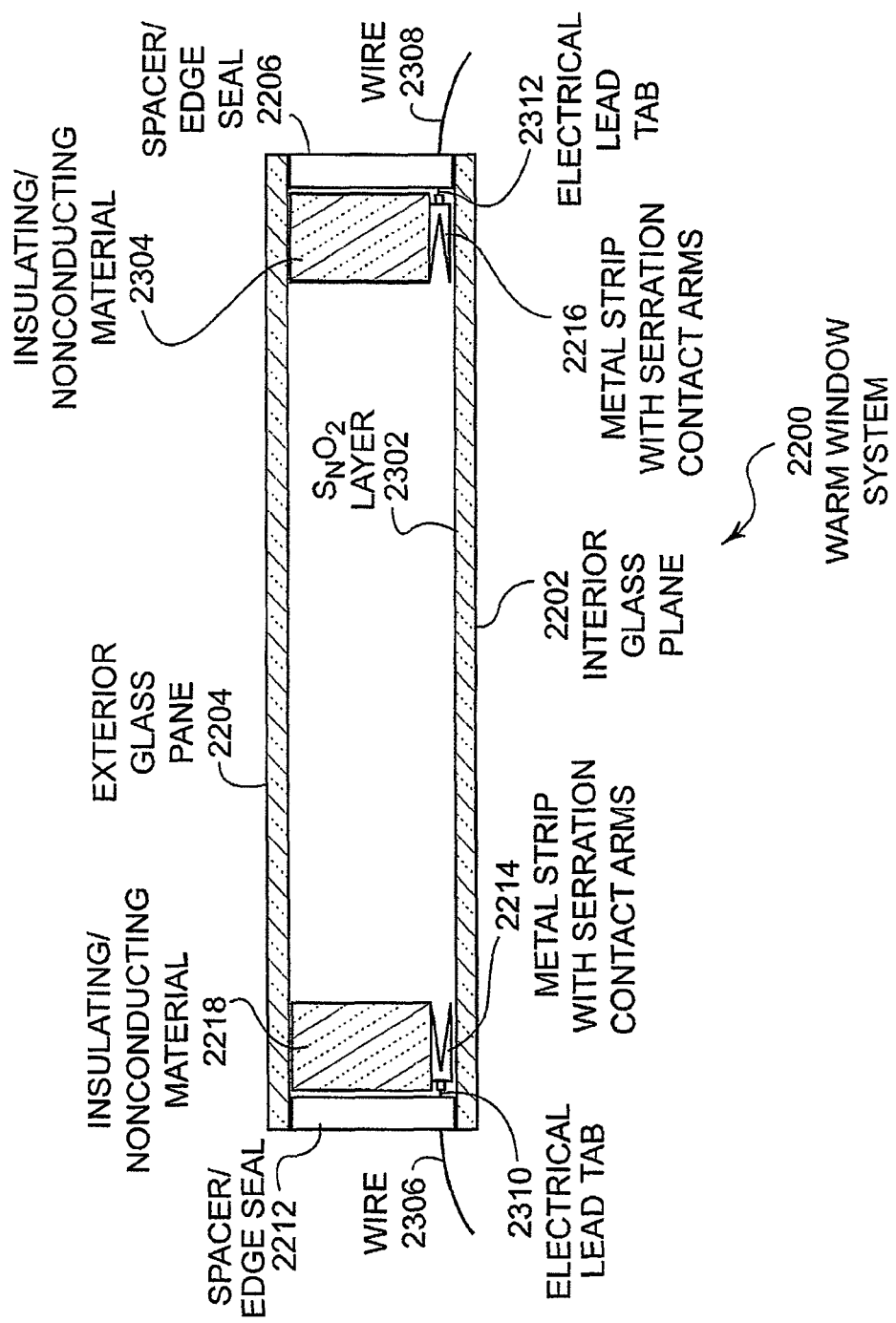
FIG. 23 is a side view of the embodiment of FIG. 22.

As also shown in FIG. 22, insulating and nonconductive material 2218 is affixed to at least one metal strip 2214 having serrations 2215. Metal strip 2214 is disposed at the opposite end of the window to metal strip 2216. Metal strip 2216 having serrations 2217 is affixed to insulating and nonconductive material 2304 (FIG. 23). The metal strip can be affixed by gluing, bending, melting or otherwise adhering the metal strip 2216 to the insulating and nonconducting layer. Also, the insulating and nonconducting layer may have a slot or other mechanical means for attaching the metal strip. Metal strips 2214, 2216 can comprise any type of conductive material such as copper, beryllium copper alloy, ferris metals or other conductive materials or conductively coated materials such as described above. The metal strips 2214, 2216 are separate pieces that are sized to fit onto the insulating and nonconductive material 2218, 2304 (FIG. 23) respectively. The metal strips 2214, 2216 fit tightly within the space between the insulating and nonconducting material 2218, 2304 (FIG. 23) and glass pane 2202 so that the metal strips 2214, 2216 contact the inner surfaces of the glass pane 2202. Metal strips 2214, 2216 should be made of a material that is sufficiently conductive to transmit a current to a tin oxide layer disposed along the inner surface of glass pane 2202, i.e., the surface facing the interior portion of the warm window system 2200. The metal strips 2214, 2216 should be made of a material that is not only conductive, but also has sufficient springiness (i.e., has a modulus of elasticity that is sufficient) to create sufficient pressure along the inner surface of glass pane 2202 to create an electrical contact capable of carrying the desired amount of current and to hold the metal strips 2214, 2216 in place. The serration contact arms 2216 independently contact the tin oxide layer to maximize contact surface and eliminate noncontact due to bending or warping of a metal strip that does not have serrations.

FIG. 23 is a side view of the embodiment of the warm window system 2200 of FIG. 22. As shown in FIG. 23, glass panes 2202, 2204 are separated by spacers 2206, 2212. Metal strips 2214, 2216 fit tightly between the glass pane 2202 and insulating and nonconductive material 2218, 2304. Because of the tight fit and modulus of elasticity of the metal strips 2214, 2216 between the glass pane 2202 and insulating and nonconductive material 2218, 2304, physical pressure is applied between the metal strips 2214, 2216 and the inner surface of the glass panes 2202.

As also shown in FIG. 23, the inner surface of glass pane 2202 has a conductive coating such as tin oxide coating 2303. The tin oxide coating 2303 may be either a hard coat layer that is formed during the formation of the glass, or a soft coat layer that is applied by plasma sputtering, or other techniques, onto the inner surface of glass pane 2202. The metal strips 2214, 2216 can be used with either type of tin oxide coating since the electrical contact between the metal strips 2214, 2216 is made through physical contact, and not by high temperature deposition techniques that are expensive and could damage a soft coat tin oxide layer, or cause glass pane 2202 to break, especially if it is made of laminated and/or annealed glass.

As further shown in FIG. 23, wire 2306 is soldered at electrical lead tab 2310 to metal strip 2214. Since the electrical lead tab 2310 is on the side of the metal strip 2214, it is not visible when looking through the window. Similarly, wire 2308 is soldered to electrical lead tab 2312 on the side of metal strip 2216.

Figure 24:
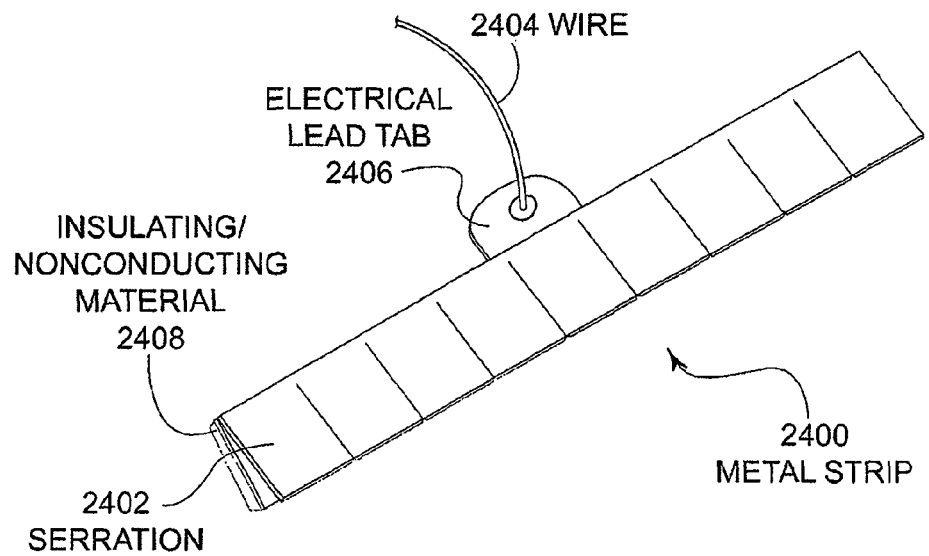
FIG. 24 is an isometric view of a serrated metal strip.

FIG. 24 is an isometric view of an embodiment of a metal strip 2400. As shown in FIG. 24, metal strip 2400 has a series of serrations 2402 that create a plurality of flanges. The metal strip 2400 is made of a conductive material so that the flanges 2401 makes independent contact with the tin oxide layer 2302 (FIG. 23) on the inside surface of the inside pane of glass 2202 (FIG. 23). The insulating and nonconductive material 2408 prevents electrical contact of the metal strip 2400 with the inside surface of the outside pane 2204 (FIG. 23). The electrical lead tab 2406 provides a soldering point for wire 2404. Wire 2404 carries the current to metal strip 2400.

Figure 25:
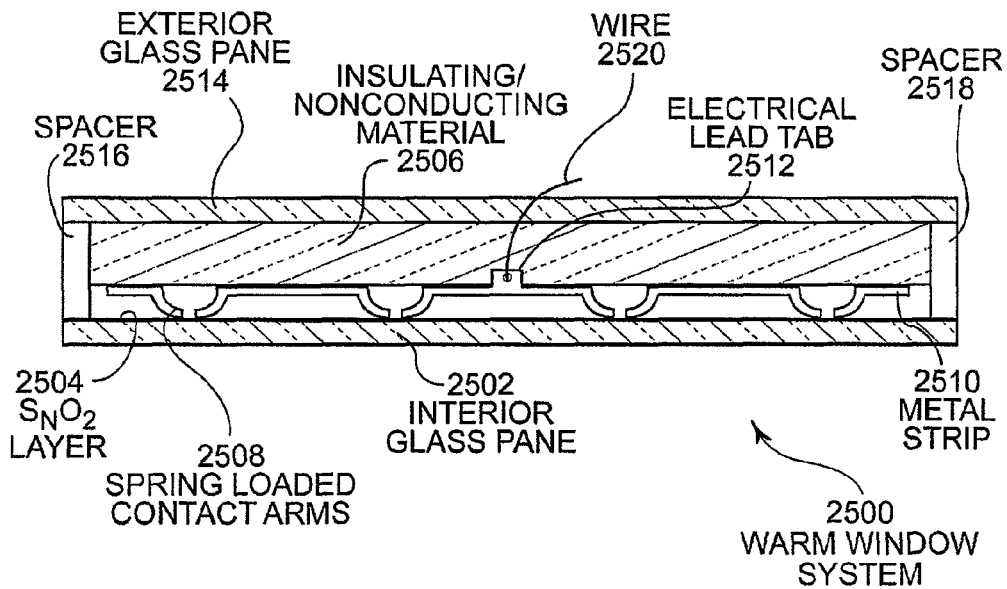
FIG. 25 is a side view of another embodiment of a warm window system.

FIG. 25 is a side view of another embodiment of a warm window system 2500. As shown in FIG. 25, the warm window system 2500 includes glass panes 2502, 2514. These glass panes are separated by spacers 2516, 2518. Spacers 2516, 2518 are typical spacers used on double pane glass windows and may provide a hermetic seal between the panes of glass. In addition, spacers 2516, 2518 may constitute a single spacer that is wrapped around the periphery of the window panes. Heat resistant material may be used for spacers 2516, 2518, as well as nonconductive materials.

As also shown in FIG. 25, insulating and nonconductive material 2506 is affixed to one side of metal strip 2510 in any desired fashion, as disclosed above. The metal strip 2510 can comprise any type of conductive material such as copper, beryllium copper alloy, ferris metals or other conductive materials or conductively coated materials. The metal strip 2510 is a separate piece from the insulating and nonconductive material 2506. The contact arms are formed into the metal strip 2510 in any desired fashion including a punchout roller or similar device that is capable of both cutting the metal strip to form the opening between adjacent contact arms and pushing the contact arms out from the surface of the metal strip 2510. The metal strip 2510 fits tightly within the space between the insulating and nonconductive material 2506 and glass pane 2502 so that the spring loaded contact arms, such as contact arm 2508, contact the inner surfaces of the glass panes 2502. The metal strip 2510 should be made of a material that is sufficiently conductive to transmit a current to a conductive layer, such as tin oxide layer 2504 disposed along the inner surface of glass pane 2502, i.e., the surface facing the interior portion of the warm window system 2500. The metal strip 2510 and spring loaded contact arms 2508 should be made of a material that is not only conductive, but also has sufficient springiness (i.e., has a modulus of elasticity that is sufficient) to create sufficient pressure along the inner surface of glass pane 2502 to create an electrical contact capable of carrying the desired amount of current and to hold the metal strip 2510 in place.

As also shown in FIG. 25, electrical lead tab 2512 is attached to the metal strip 2510 to provide a point of contact for wire 2520. Wire 2520 provides sufficient current to metal strip 2510 so as to generate heat for the warm window system 2500.

Figure 26:
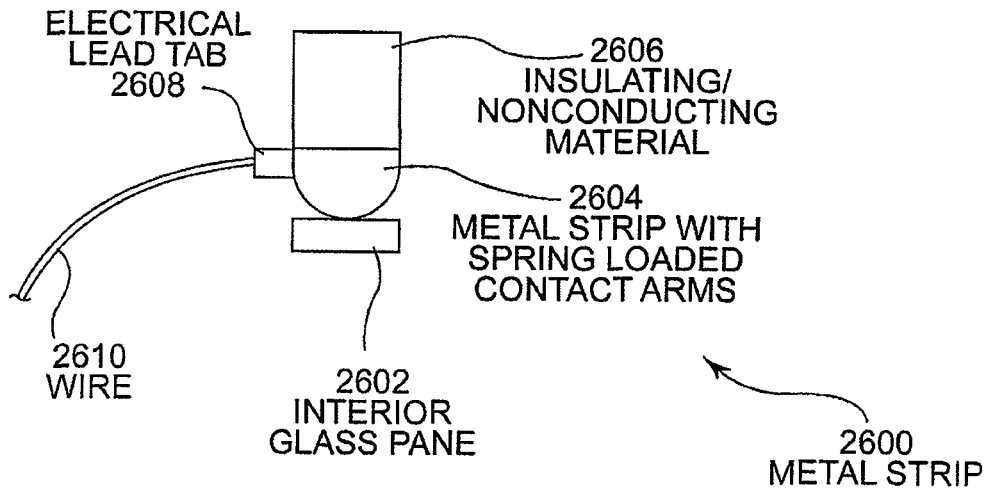
FIG. 26 is an end view of the embodiment of FIG. 25.

FIG. 26 is an end view of an embodiment of a metal strip 2600. As shown in FIG. 26, metal strip 2600 has a series of spring loaded contact arms 2604. Metal strip 2600 is made of a conductive material so that the spring loaded contact arms 2604 make electrical contact with the tin oxide layer 2603 on the inside surface of the inside pane of glass 2602. Insulating and nonconductive material 2606 is affixed to metal strip 2600 by any of the ways described above and prevents electrical contact of the metal strip 2600 with the inside surface of the exterior pane 2605 which may have a tin oxide layer disposed thereon for insulation purposes. Electrical lead tab 2608 provides a soldering point for wire 2610. Wire 2610 provides sufficient the current to metal strip 2600 in order to heat the warm window system.

Figure 27:
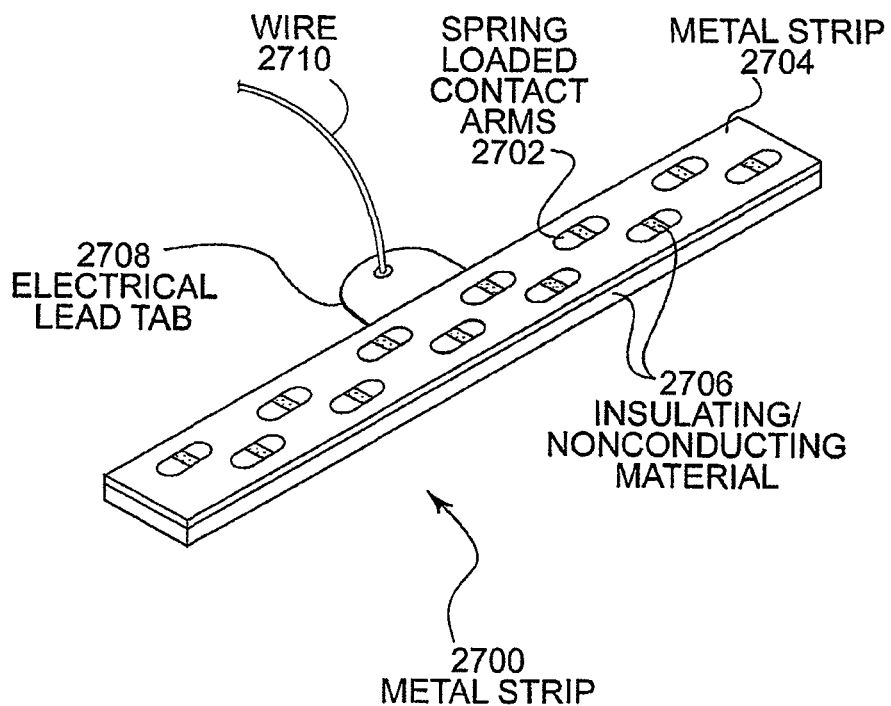
FIG. 27 is an isometric view of a metal strip with spring loaded contact arms.

FIG. 27 is an isometric view of an embodiment of a metal strip 2700. As shown in FIG. 27, metal strip 2700 has a series of spring loaded contact arms 2702. Metal strip 2700 is made of a conductive material so that the spring loaded contact arms 2702 make electrical contact with the tin oxide layer on the inside surface of the inside pane of glass.

Insulating and nonconductive material 2706 is affixed to metal strip 2704 in any desired fashion, as disclosed above, and prevents electrical contact of the metal strip 2700 with the inside surface of the exterior pane. The electrical lead tab 2708 provides a soldering point for wire 2710. Wire 2710 provides sufficient current to metal strip 2700 to heat the warm window system.

Figure 28:
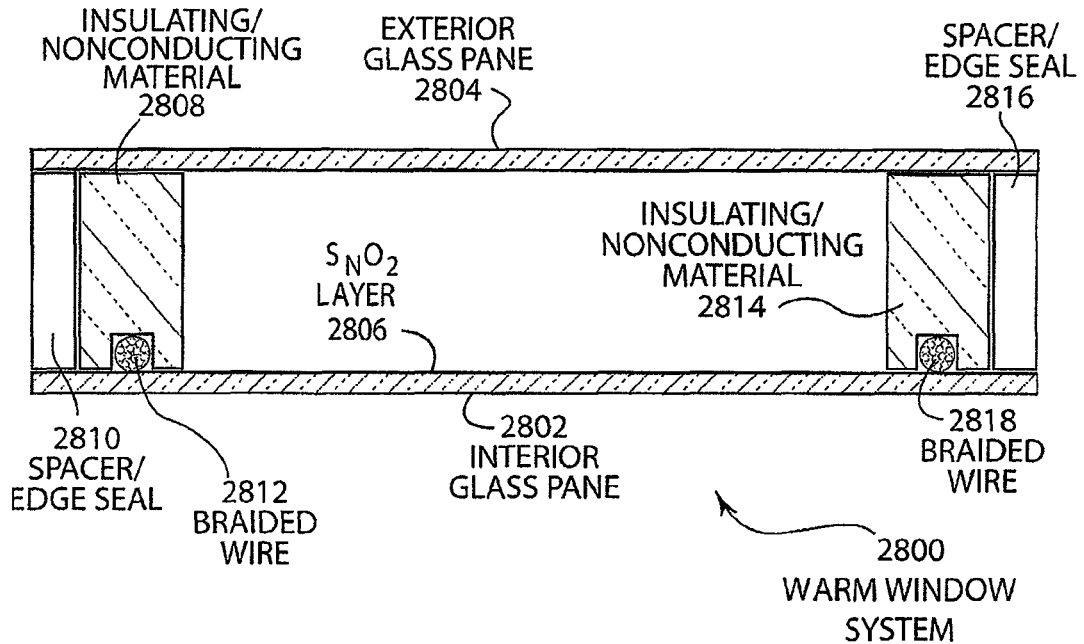
FIG. 28 is an end view of another embodiment of a warm window system.

FIG. 28 is an end view of another embodiment of a warm window system 2800. As shown in FIG. 28, the warm window system 2800 includes glass pane 2802 and glass pane 2804. These glass panes are separated by spacers 2810, 2816. The spacers 2810, 2816 are typical spacers used on double pane glass windows and may provide a hermetic seal between the panes of glass. In addition, spacers 2810, 2816 may constitute a single spacer that is wrapped around the periphery of the window panes. Heat resistant material may be used for spacers 2810, 2816, as well as nonconductive materials.

As also shown in FIG. 28, insulating and nonconductive material 2808, 2814 are affixed to at least two braided metal wires 2812, 2818 respectively, in any desired fashion as disclosed above, including the slot in the insulating and conducting layer. Braided wires 2812, 2818 are disposed at opposite ends of the warm window system 2800. Braided wires 2812, 2818 can comprise any type of conductive material such as copper, beryllium copper alloy, ferris metals or other conductive materials or conductively coated materials. The braided wires 2812, 2818 are separate pieces that are sized to fit into the insulating and nonconductive material 2808, 2814. The braided wires 2812, 2818 fit tightly within the space between the insulating and nonconductive material 2808, 2814 and glass pane 2802 so that the braided wires 2812, 2818 contact the inner surfaces of the glass panes 2802. The modulus of elasticity of the braided wire and the insulating and nonconductive layer taken together creates the tight fit. Braided wires 2812, 2818 should be made of a material that is sufficiently conductive to transmit a current to a tin oxide layer 2806 disposed along the inner surface of glass pane 2802, i.e., the surface facing the interior portion of the warm window system 2800. The braided wires 2812, 2818 should be made of a material that is conductive and also may have sufficient springiness (i.e., has a modulus of elasticity that is sufficient) to create sufficient pressure along the inner surface of glass pane 2802 to create an electrical contact capable of carrying the desired amount of current and to hold the braided wires in place.

Figure 29:
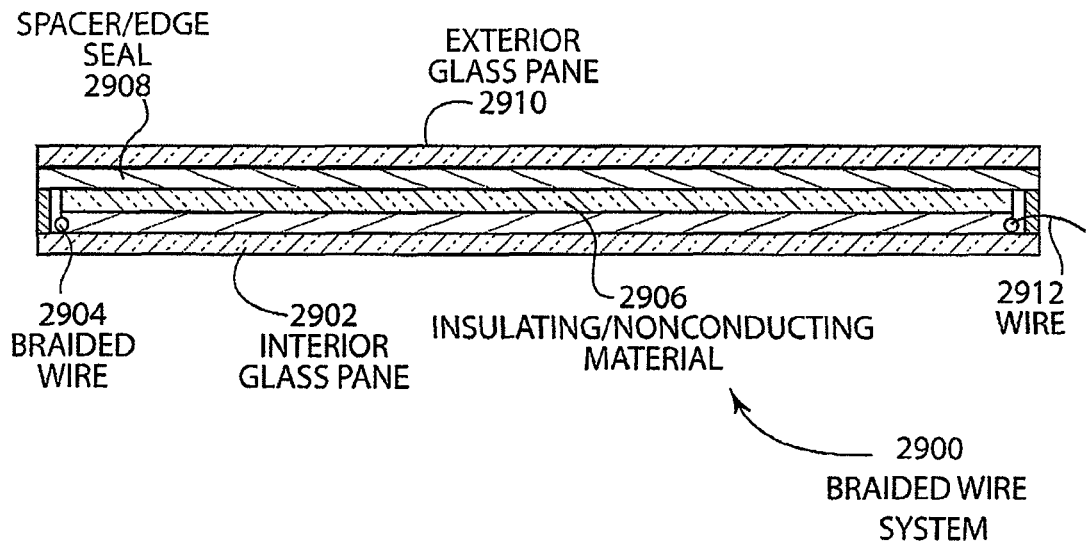
FIG. 29 is a side view of the embodiment of FIG. 28.

FIG. 29 is a side view of the embodiment of the braided wire system 2900 that is illustrated in FIG. 8. As shown in FIG. 29, glass panes 2902, 2910 are separated by spacer 2908. Braided wire 2904 fits tightly between the glass pane 2902 and insulating and nonconductive material 2906. Because of the tight fit of braided wire 2904 between glass pane 2902 and insulating and nonconductive material 2906, physical pressure is applied between braided wire 2904 and the inner surface of glass panes 2902. As also shown in FIG. 29, wire 2912 is soldered directly to braided wire 2904.

Figure 30A:
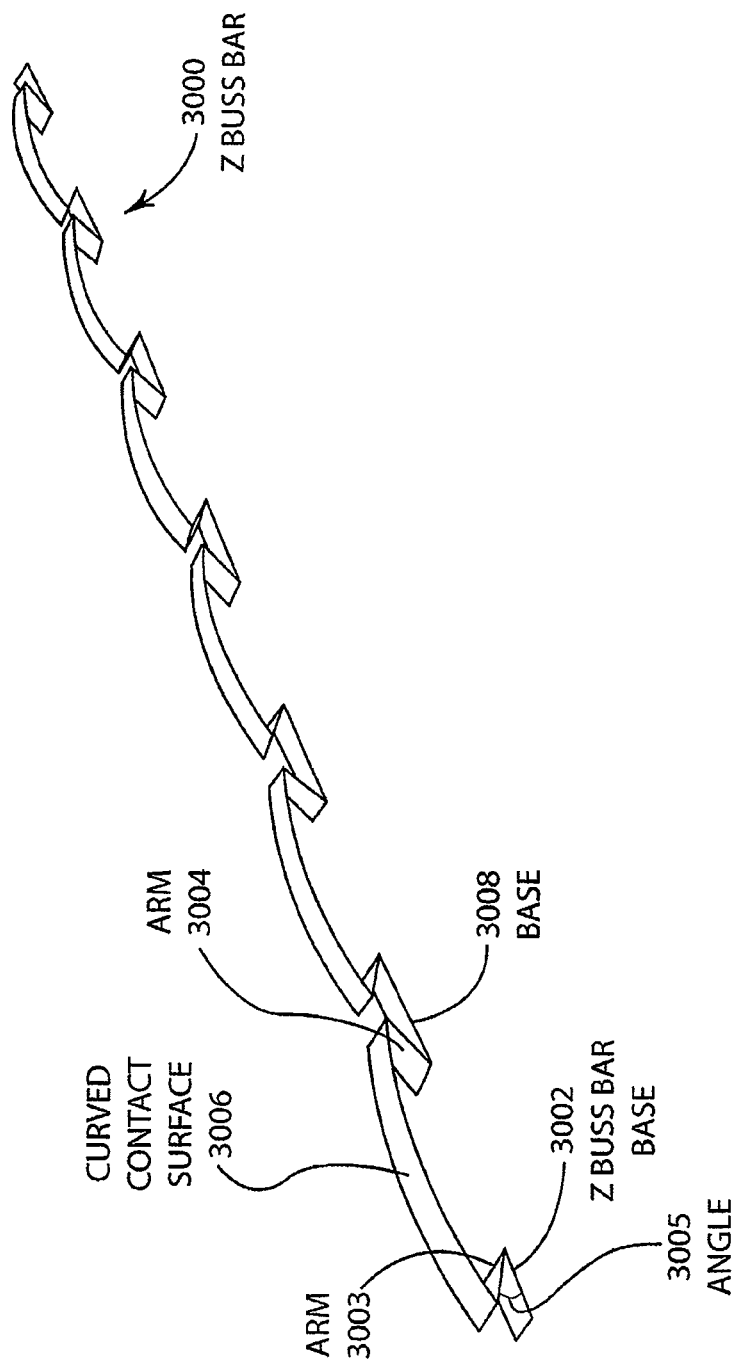
FIG. 30A is a schematic isometric view of an embodiment of a z buss bar.

FIG. 30A is an isometric view of a metal strip 3000 showing another embodiment of a buss bar design that is referred to as the "z" buss bar design, because of the shape of the buss bar 3000. The z buss bar design can comprise any type of conductive material such as copper, beryllium copper alloy, ferris metals or other conductive materials or conductively coated materials. The z buss bar shape, as shown in FIG. 30A, comprises a conductive flat metal strip having a base 3002 and an arm 3003 that is formed by bending the flat metal strip toward the base to form an angle 3005 that is less than a 90° angle from the base 3002. The z buss bar design thus creates an arm 3003 that overlaps base 3002 at an angle that is less than 90° (i.e. acute angle) from base 3002. The conductive metal is then bent again in the opposite direction of the first arm 3003, thus creating a curved contact surface 3006. The metal is then bent again in a downward direction, forming another arm 3004. The metal is then bent in the opposite direction (away from first base 3002) forming base 3008.

The purpose of arm 3003 and arm 3004 is to create a sufficient amount of reactive force to compensate for forces acting on the curved surface 3006 by a coated glass plate. The conductive metal strip should be made of a material that has sufficient springiness (i.e., has a modulus of elasticity that is sufficient) to create a reactive force great enough to cause the curved contact surface 3006 to be pushed against a tin oxide layer on a glass surface so that an electrical contact created between the contact surface 3006 and the tin oxide layer is capable of carrying a desired amount of current in the tin oxide layer to heat the tin oxide layer and to hold the z buss bar in place between two glass layers.

Figure 30B:
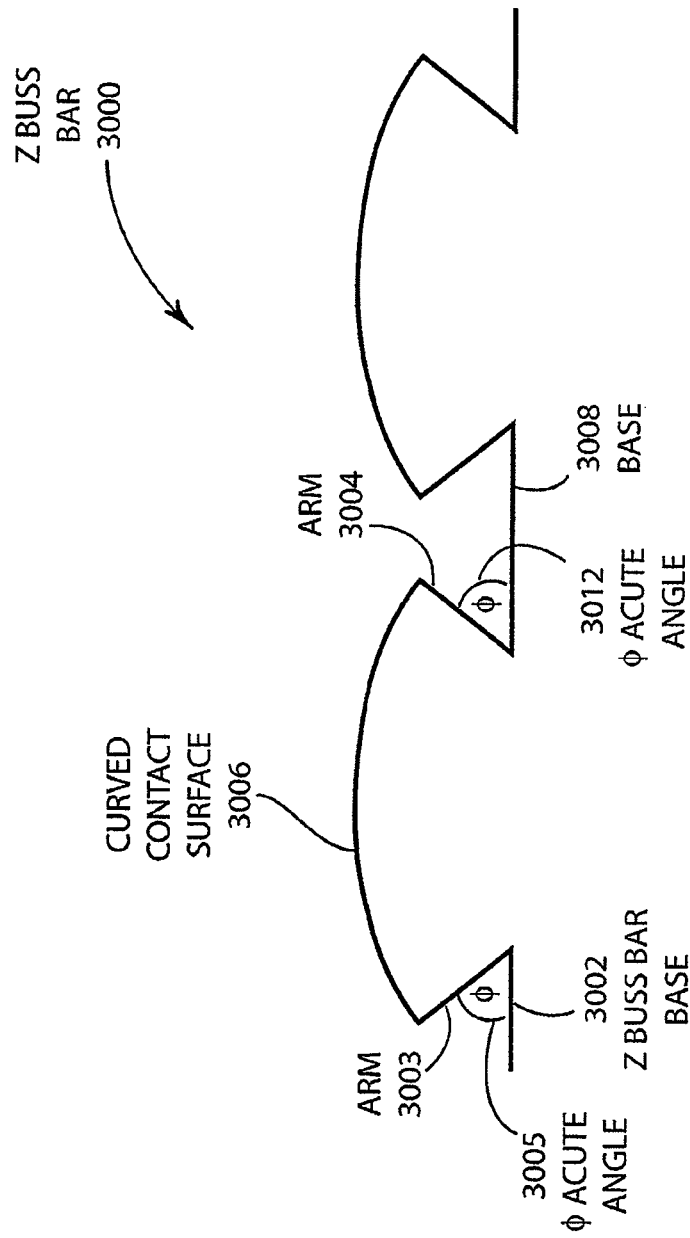
FIG. 30B is a schematic side view of the z buss bar illustrated in FIG. 30A.

FIG. 30B is a side view of an embodiment of the z buss bar 3000 illustrated in FIG. 30A. The z buss bar base 3002 forms an acute angle 3005 with arm 3003. Base 3008 forms acute angle 3012 with arm 3004. Acute angle 3005 may be made equal to acute angle 3012, although other angles can also be foamed that are not equal. Curved contact surface 3006 connects arms 3003, 3004.

Figure 31:
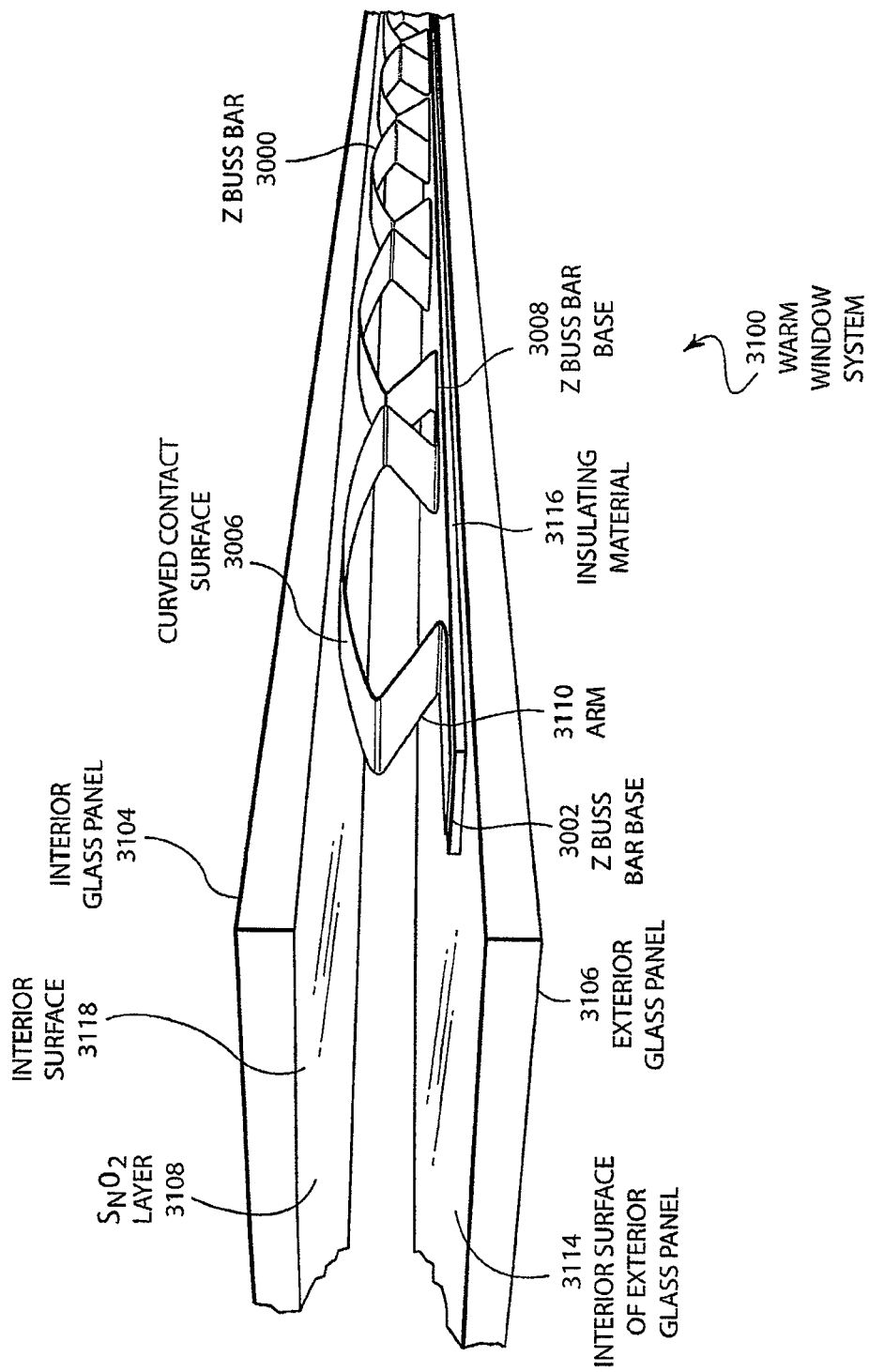
FIG. 31 is an exploded view of an embodiment of a warm window system using the z buss bar of FIG. 30A.

FIG. 31 is an assembly view of a warm window system 3100 that utilizes z buss bar 3000. As shown in FIG. 31, the warm window system 3100 includes glass panes 3104, 3106. A conductive metal oxide coating, such as a tin oxide layer 3108 or an alternate conductive metal, is applied to the interior surface 3118 of the interior glass panel 3104. The warm window system 3100 comprises an insulating material 3116 affixed to the interior surface 3114 of the external pane of glass 3106 in any desired fashion, as explained above. The insulating and non-conductive material 3116 sits on the interior surface 3114 of the exterior glass panel 3106 to ensure current is not transferred from the z buss bar 3000 to the external glass panel 3106. The interior surface 3114 of the external glass panel 3106 may also be coated with a tin oxide coating (or other similar coating as described earlier) to reflect radiant heat back to the internal glass panel 3104. The z buss bar 3000 is shown uncompressed and incorporated into the warm window system 3100 illustrated in FIG. 31. Bases 3002, 3008 are disposed on the insulating material 3114 to prevent conduction to a conductive layer that may be disposed on interior surface 3114 or conduct heat to exterior glass panel 3106. The curved contact surface 3006 of the z buss bar, as shown in FIG. 31, is in an uncompressed state prior to force being applied to the curved surface 3006, that causes the z buss bar 3000 to be pushed against a tin oxide layer 3108 on interior surface 3118 of interior glass panel 3104.

Figure 32:
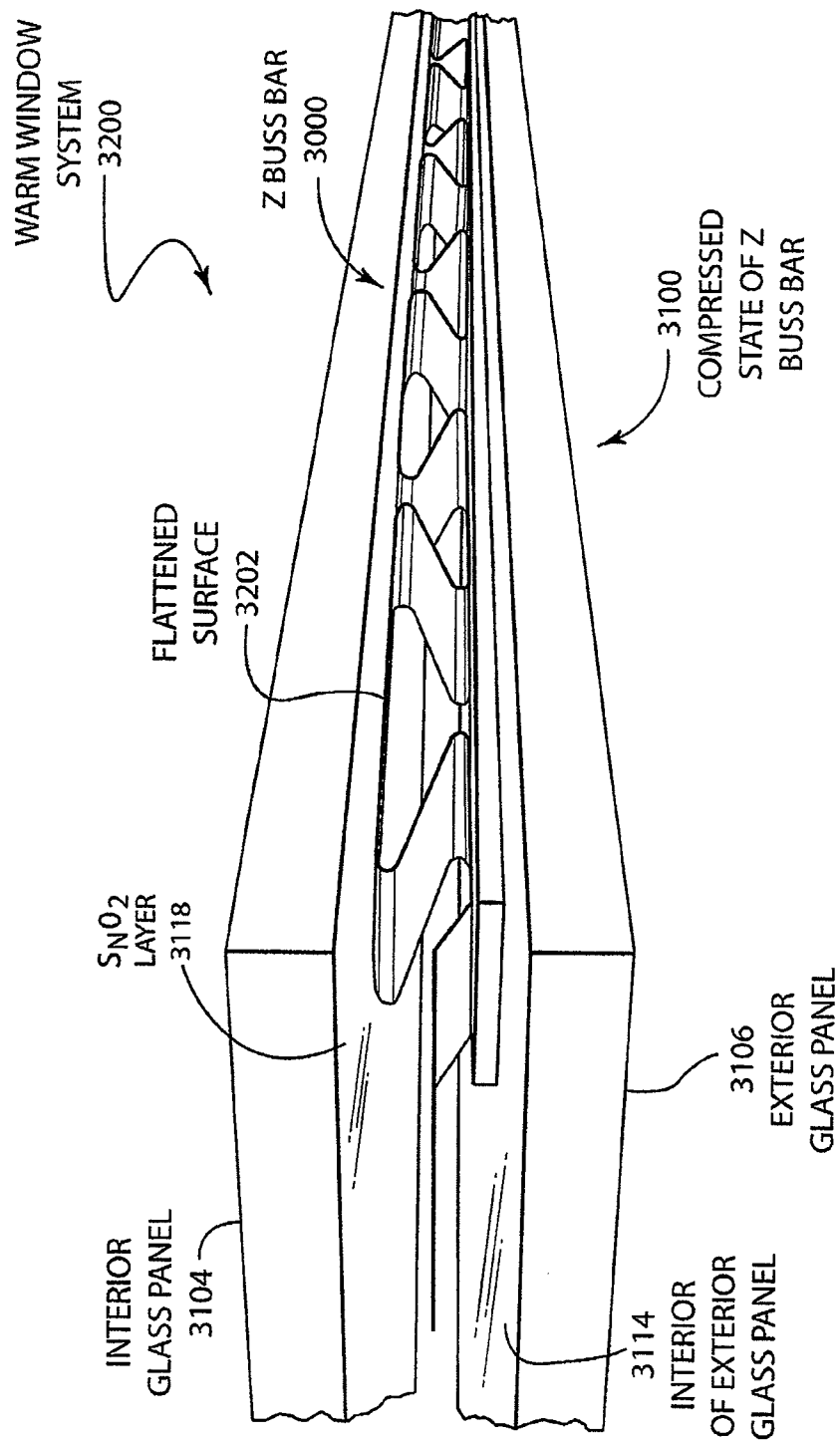
FIG. 32 is a schematic illustration of an assembled warm window system using the embodiment of a z buss bar illustrated in FIG. 30B.

FIG. 32 is an assembled isometric view of a warm window system 3100 showing the z buss bar 3000 in a compressed state 3200. In other words, enough physical force has been applied to the curved contact surface 3006 (FIG. 31) for the z buss bar 3000 to flatten the curved surface 3006 (FIG. 31) and produce flattened surface 3202, as shown in FIG. 32. The physical force created by assembling the warm window system 3200 from the pressure applied by the glass panels 3104, 3106 causes a sufficient reactive force on the z buss bar 3000 to create a secure electrical contact between the z buss bar 3000 and tin oxide layer 3118, such that no hot spots are created, and the z buss bar 3000 is held securely in place between interior glass panel 3104 and exterior glass panel 3106.

Figure 33:
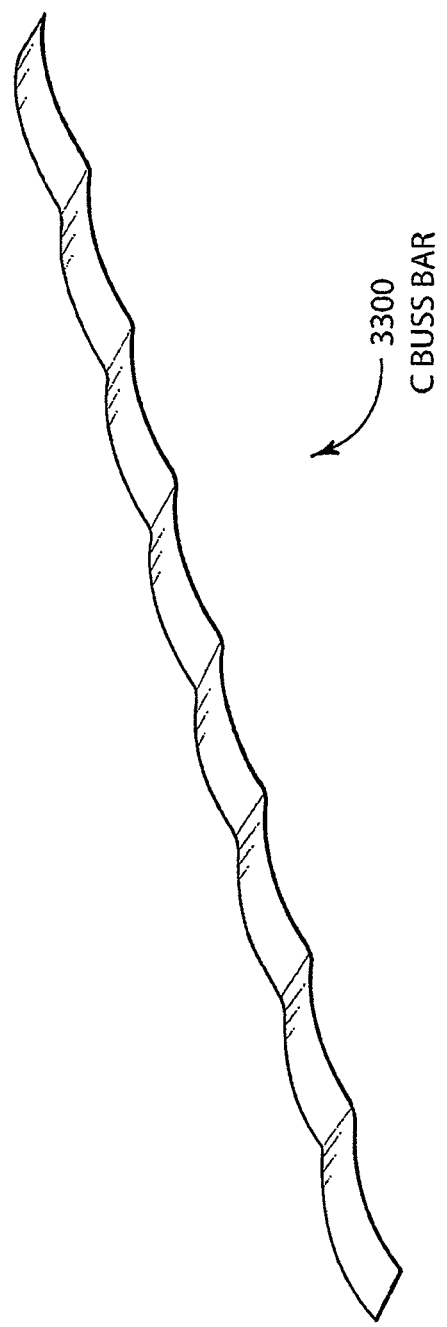
FIG. 33 is a schematic isometric view of an embodiment of a c buss bar.

FIG. 33 is an isometric view of an embodiment of a metal strip 3300 showing another embodiment of a buss bar design that is referred to as the "c" buss bar 3300 because of the shape of the buss bar design. The c buss bar 3300 can comprise any type of conductive material such as copper, beryllium copper alloy, ferris metals or other conductive materials, including conductively coated materials. The c buss bar 3300, as shown in FIG. 33, comprises a conductive metal in a curved c shape (i.e. the letter c rotated clockwise 180°) with any desired radius of curvature desired. In other words, the c buss bar 3300 can have a curvature that can vary from virtually flat, to vertically parabolic in shape, as well as other rounded shapes.

Figure 34:
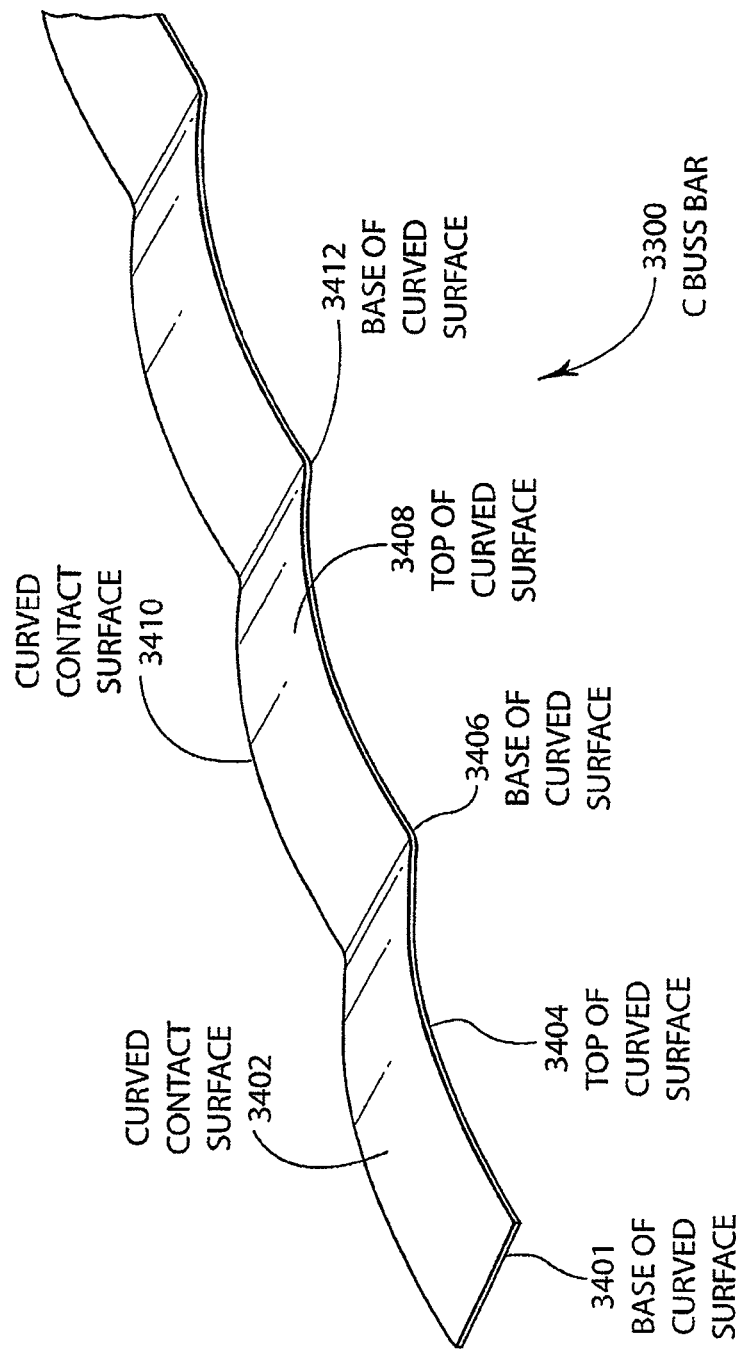
FIG. 34 is a close-up view of the embodiment of a c buss bar of FIG. 33.

FIG. 34 is an expanded isometric view of the c buss bar 3300 illustrated in FIG. 33. As shown in FIG. 34, the c buss bar 3300 has a base 3401, a curved contact surface 3402 and another base 3406. The curved surface 3402 has a top portion 3404 that is midway between bases 3401 and 3406. Another curved surface 3410 ends with another base 3412. The above pattern continues for the remainder of the length of c buss bar metal strip 3300. The bases 3401, 3406, 3412 lie flat (parallel to the horizontal surface) and can create a sufficient amount of reactive force to compensate for forces acting the tops of curved surfaces 3404, 3408. The conductive metal strip can be made of a material that has sufficient springiness (i.e., has a modulus of elasticity) to create a reactive force great enough to support curved contact surfaces 3402, 3410, and any force that may be applied to the curved contact surfaces 3402, 3410 to create an electrical contact capable of carrying the desired amount of current, in a warm window system, and hold the c buss bar in place.

Figure 35:
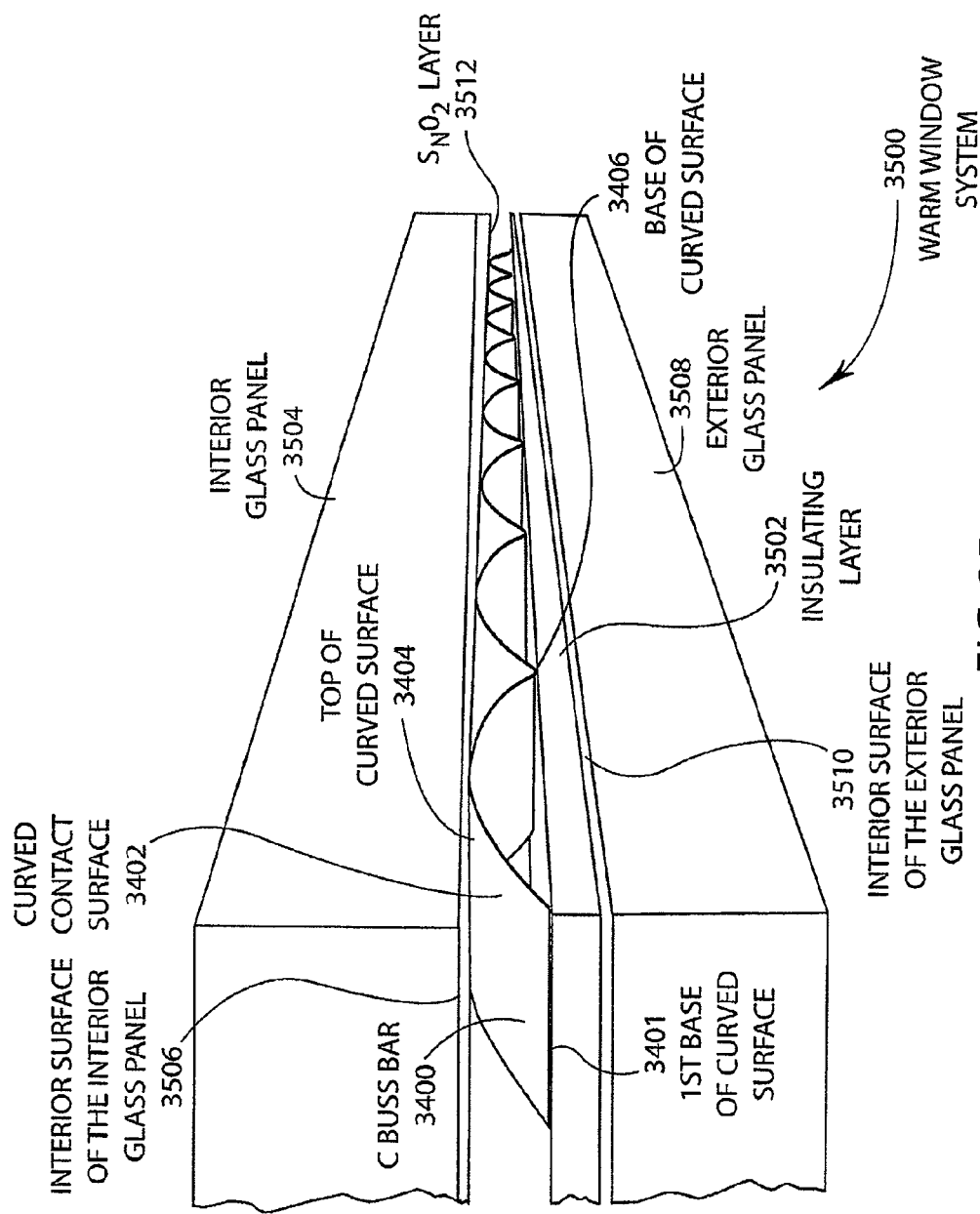
FIG. 35 is an expanded view of an embodiment of a warm window system using the c buss bar of FIG. 34.

FIG. 35 is an assembly drawing of a warm window system 3500 that utilizes the c buss bar system 3300. As shown in FIG. 35, the warm window system 3500 includes interior glass pane 3504 and exterior glass pane 3508. A conductive metal oxide coating 3512 (such as a tin oxide layer or an alternate conductive metal) is applied to the interior surface 3506 of the interior glass panel 3504. The warm window system 3500 includes an insulating material 3502 affixed to the interior surface 3510 of external pane of glass 3508 in any desired fashion, as set forth above. The insulating and nonconductive material 3502 is disposed between the interior surface 3510 of the external glass panel 3508 and the c buss bar 3400 to ensure current is prevented from passing to any conductive layer that may be disposed on the interior surface 3510 of the exterior glass panel 3508. The interior surface 3506 of the interior glass panel 3504 is coated with a tin oxide coating 3512 to generate heat on interior glass panel 3504 when current is applied to the c buss bar 3400. The warm window system 3500 is shown in FIG. 35 in an uncompressed state prior to assembly. Base 3401 of the c buss bar 3400 and base 3406 of the c buss bar 3400 are disposed over the insulating material 3502. The top of the curved contact surface 3404 is adjacent to the tin oxide layer 3512 and is compressed onto the tin oxide layer 3512 during assembly.

Figure 36:
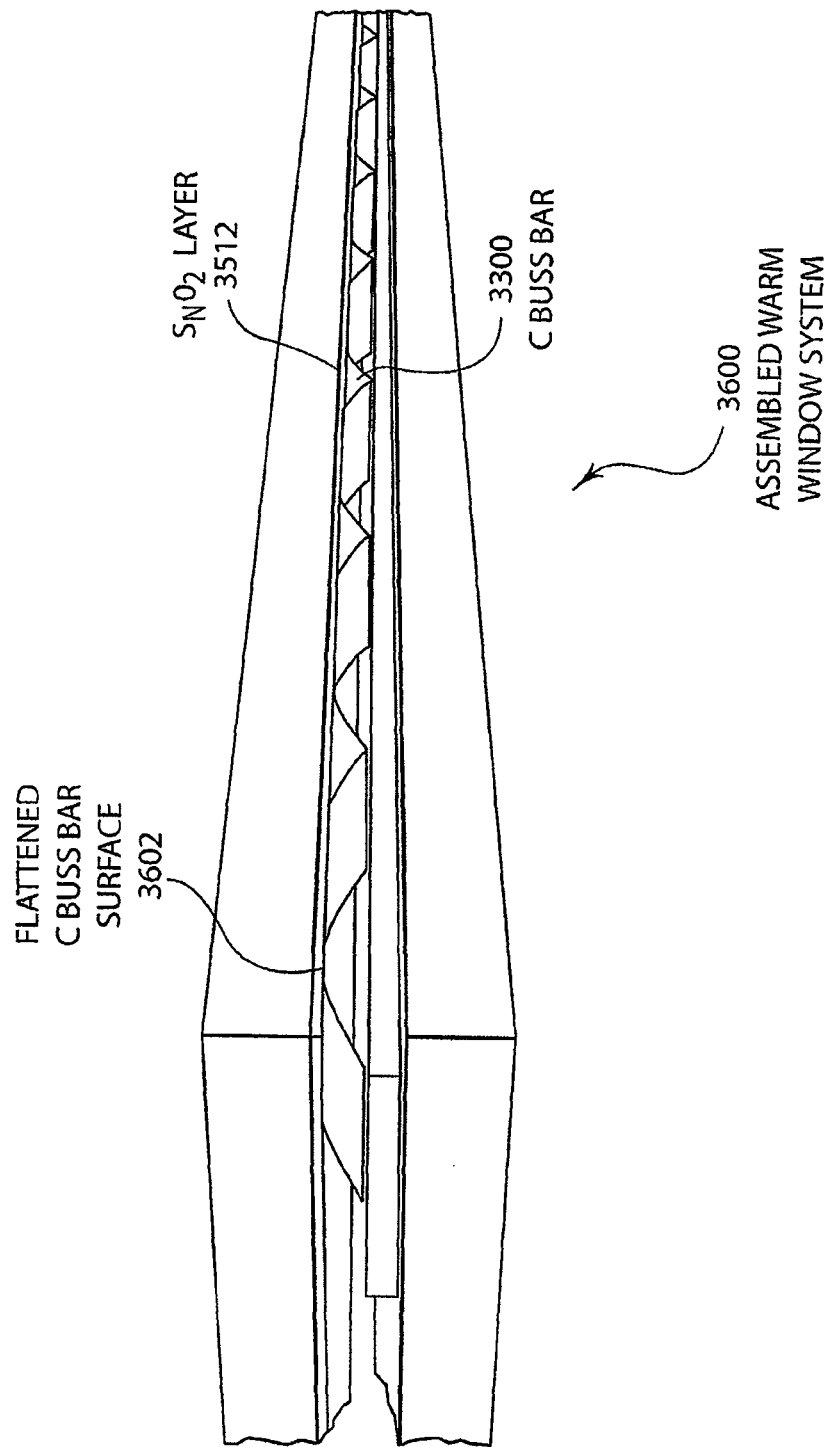
FIG. 36 is an embodiment of an assembled warm window system using the c buss bar of FIG. 34.

FIG. 36 is an assembled isometric view of a warm window system 3600 showing the c buss bar 3300 in a compressed state. Sufficient physical force from glass panes 3504, 3508 (FIG. 35) has been applied to the curved contact surface 3402, 3410 (FIG. 34) to create a somewhat flattened shape 3602 in FIG. 36, causing a sufficient reactive force on the c buss bar 3300 to provide a large area of electrical conduction between the c buss bar 3300 and tin oxide layer 3512. The reactive force also holds the c buss bar 3300 in place.

Figure 37:
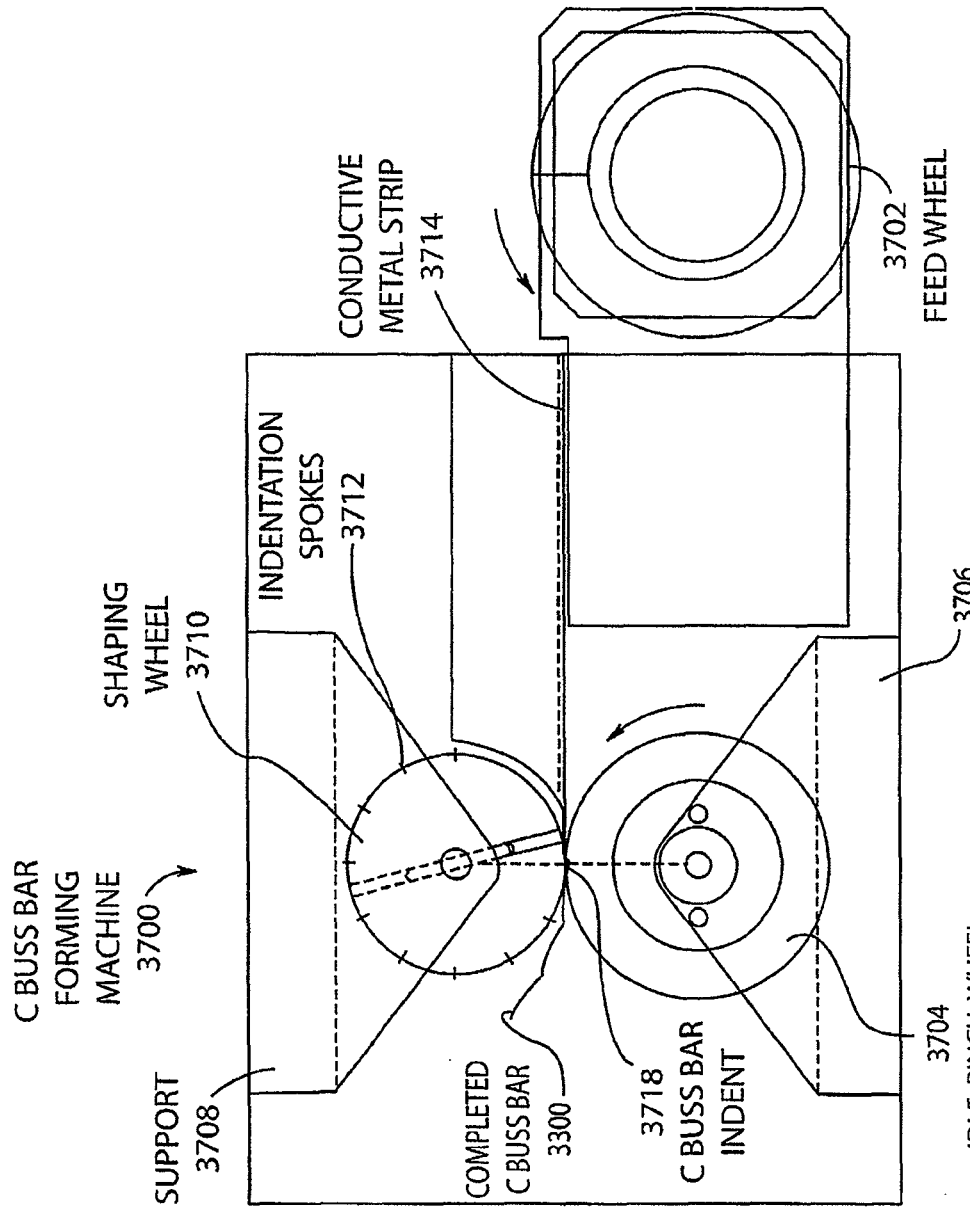
FIG. 37 is a schematic side view of an embodiment of a c buss bar forming machine.

FIG. 37 is a side view of the c buss bar forming machine 3700 that can be used to manufacture c buss bar 3000 shown in FIGS. 33 and 34. The feed wheel 3702 is a wheel that has a conductive metal strip wound around it, or could also contain a spool of conductive metal. Shaping wheel 3710 rotates clockwise, pinching conductive metal strip 3714 between idle pinch wheel 3704 and shaping wheel 3710, thereby drawing conductive metal strip 3714 from the feed wheel 3702 and feeding metal strip 3714 through the c buss bar forming machine 3700. The shaping wheel 3710 is held in place by support 3708. The shaping wheel 3710 has indentation spokes 3712 protruding from shaping wheel 3710 which are separated by a pre-selected distance to form the c buss bar 3300. Idle pinch wheel 3704 is held in place by support 3706 and is made of a compressible material, such as rubber, that can spring back to its original shape when force is applied to the material. In other words, idle pinch wheel 3704 is made of a material that is elastic enough that it will not permanently deform when indentation spokes 3712 apply physical force to conductive metal strip 3714, and springs back to its original circular shape. Feed wheel 3702 houses conductive metal strip 3714 and feeds the conductive metal strip 3714 towards wheels 3710, 3704. Shaping wheel 3710 rotates in a clockwise direction, indenting conductive metal strip 3714 with indentation spokes 3712. Idle pinch wheel 3704 rotates in a counter-clockwise direction receiving the indentation spokes 3702 on the idle wheel 3704 springy surface. The rotation of the feed wheel 3702, the idle pinch wheel 3704, and the shaping wheel 3710 produces the final c buss bar strip 3300. Indentation spokes 3712 located on the shaping wheel 3710 can be any desired length protruding from shaping wheel 3710. Indentation spokes 3712 can also be located at any desired distance from each other. The length of protrusion of the indentation spokes 3712, as well as the distance the indentation spokes 3712 are from each other, controls the shape and size of the curved contact surfaces 3402, 3410.

Figure 38:
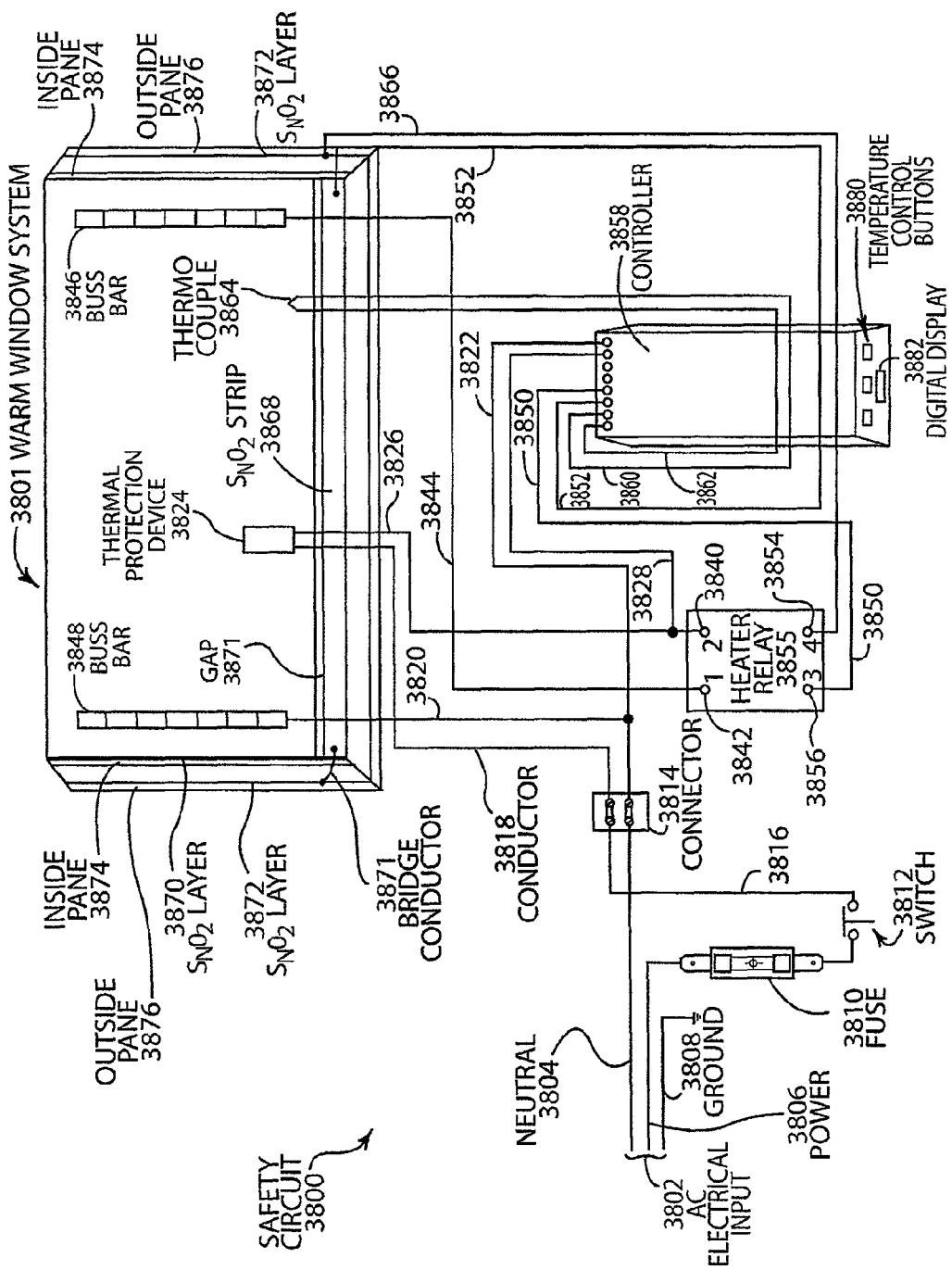
FIG. 38 is a schematic circuit diagram of an embodiment of a safety circuit system that can be utilized with a warm window system.

FIG. 38 is a schematic circuit diagram of a safety circuit 3800 for warm window system 3801. The safety circuit 3800 is connected to the warm window system 3801 to control the application of power from the AC electrical input 3802 to prevent shock hazards and other safety concerns that may exist from the application of the AC electrical input 3802 to the warm window system 3801. As shown in FIG. 38, the electrical input 3802 comprises power lead 3806, neutral lead 3804, and ground 3808. Power lead 3806 is connected to switch 3812, conductor 3816, connector block 3814, conductor 3818 and thermal protection device 3824. The power lead 3806 is connected to controller 3858 through conductor 3826 and conductor 3828. Neutral lead 3804 passes through connector block 3814 and is connected to the buss bar 3848 via conductor 3820, and to controller 3858 via connector 3822.

As also shown in FIG. 38, the fuse 3810 in the power lead 3806 provides protection for over-current situations that may occur as a result of shorts or other problems associated with the AC electrical circuit. Connector block 3814 provides a quick disconnect device for disconnecting the AC electrical input from the remainder of the circuit. Thermal protection device 3824 generates an open circuit to shut down the AC electrical input 3802 to the warm window system 3801 whenever the temperature of the inside pane 3874 of the warm window system 3801 exceeds a predetermined temperature. Buss bars 3848 and 3846 apply current to the tin oxide layer 3870 in the same manner as disclosed herein.

The safety circuit 3800 of FIG. 3 is operated by controller 3858. Controller 3858 applies a potential across leads 3860, 3862 which is attached to the thermo-couple 3864, that is disposed on the inside pane 3874. Thermo-couple 3864 causes the current that is conducted through leads 3860, 3862 to vary in accordance with the temperature detected by thermo-couple 3864. Hence, the controller 3858 can determine the temperature of the inside pane 3874 based upon the amount of current that is transmitted through the thermo-couple 3864. Digital display 3882 on the controller 3858 displays the current temperature and the desired temperature of the warm window system 3801. The desired temperature of the warm window system 3801 can be adjusted using control buttons 3880. Controller 3858 compares the actual temperature of glass pane 3874, that is detected by controller 3858 via conductors 3860, 3862 and thermo-couple 3864, with the desired temperature set in the controller 3858. When the temperature of the glass pane 3874 is less than the desired temperature, controller 3858 applies a low voltage DC signal to conductor 3852. Conductor 3852 is connected to a tin oxide strip 3868 that is isolated from the tin oxide heating layer 3870 on inside glass pane 3874. The isolated tin oxide strip 3868 conducts current to bridge conductor 3871, which is connected to the tin oxide layer 3872 on the inside of the outside pane 3876, which conducts current to conductor 3866. A separate isolated strip (not shown) can also be used on the outside pane 3876, also. Conductor 3866 is connected to terminal 3854 of heater relay 3855. Conductor 3850 is connected to terminal 3856 of heater relay 3855. The low voltage dc signal applied conductor 3852 is applied to the control terminal 3854 of heater relay 3855, when there is a conduction path through tin oxide strip 3868, bridge conductor 3871 and tin oxide layer 3872, so that the heater relay is turned-on and the low voltage dc signal is connected to terminal 3856 and conductor 3850 to complete the circuit. This process of turning-on the heater relay 3855 causes power terminal 3840 to be connected to power terminal 3842. Hence, application of a control signal to terminal 3854 on the heater relay 3855 causes the heater relay 3855 to connect power terminals 3840 and 3842, which, in turn, connects the neutral lead 3804 to the buss bar 3846 to complete the power circuit so that the AC electrical input is applied across buss bars 3848, 3846. In this manner, the controller 3858 is capable of controlling the application of the AC electrical input to the buss bars 3846, 3848 though the use of control signals on conductors 3850, 3852. In addition, since the control signals on lines 3850, 3852 are applied to the isolated tin oxide strip 3868, which is separated from the tin oxide layer 3870 by a gap 3871, and this same control signal flows through the tin oxide layer 3872 to complete the circuit, any openings in the tin oxide layer 3868 or tin oxide layer 3872, caused by cracks or breakage of the inside pane 3874 or outside pane 3876, respectively, will prevent the application of the AC electrical input 3802 to the buss bars 3846, 3848. Hence, the safety circuit 3800 has the added feature of preventing the application of power to broken or cracked glass panes in the warm window system 3801. In addition, the control signals applied to conductors 3850, 3852 are low voltage signals, such as five volt signals, that pose no electrical shock risk to users and meet UL guidelines.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A warm window system comprising:
   an outside pane of glass;
   an inside pane of glass that is coated with a conductive layer over substantially all of a inner surface of said inside pane of glass, said outside pane of glass and said inside pane of glass being arranged substantially parallel and substantially coextensive with each other to form an interior between said inside pane of glass and said outside pane of glass;
   at least one spacer that is disposed between said inside pane of glass and said outside pane of glass in a peripheral area, said inside pane of glass and said outside pane of glass being substantially aligned so that said inner surface of said inside pane of glass faces an interior portion of said warm window system;
   at least two buss bars placed in said interior portion of said warm window system adjacent to said at least one spacer, said buss bars comprising:
      a first base portion that is disposed adjacent to an inside surface of said outside pane;
      a first arm portion that is connected to said first base portion and forms an acute angle from said first base portion;
      a second base portion that is disposed adjacent to an inside surface of said outside pane;
      a second arm portion connected to said second base portion that forms an acute angle between said second base portion;
      a curved contact surface connected to said first arm portion and said second arm portion that flattens when said buss bar is compressed between said outside pane of glass and said inside pane of glass, said buss bars having a modulus of elasticity that causes said contact surface to be forced against said inner surface of said inside pane of glass, resulting in said contact surface producing a sufficient amount of physical force on said inner surface of said inside pane of glass to create an electrical contact between said contact surface and said conductive layer on said inner surface of said inside pane of glass so that said contact surface is capable of carrying a sufficient current to warm said warm window system, and a sufficient amount of physical force to hold said buss bars in a substantially stationary position in said interior portion of said warm window system.

2. A method of applying current to a conductive layer in a heated window system comprising:
   assembling a first pane of glass, having said conductive layer disposed on an inner surface of said first pane of glass, at least one spacer and a second pane of glass, said first pane of glass and said second pane of glass being arranged substantially parallel and substantially coextensive with each other to form an interior between said first pane of glass and said second pane of glass;
   providing at least two buss bars comprising:

a first base portion that is disposed adjacent to an inside surface of said outside pane;
a first arm portion that is connected to said first base portion and forms an acute angle from said first base portion;
a second base portion that is disposed adjacent to an inside surface of said outside pane;
a second arm portion connected to said second base portion that forms an acute angle between said second base portion;
said buss bars having a modulus of elasticity that causes said buss bars to produce a sufficient amount of physical force on said conductive layer disposed on said inner surface of said first pane of glass to create an electrical contact between said buss bars and said conductive layer disposed on said inner surface of said first pane of glass that is capable of carrying a sufficient current to warm said heated window system, and a sufficient amount of physical force to hold said buss bars in a substantially stationary position in said heated window system;
placing said at least two buss bars between said first pane of glass and said second pane of glass;
applying a current to one of said at least two buss bars so that current flows between said at least two buss bars and through said conductive layer.

3. A warm window system comprising:
an outside pane of glass;
an inside pane of glass that is coated with a conductive layer over substantially all of an inner surface of said inside pane of glass, said outside pane of glass and said inside pane of glass being arranged substantially parallel and substantially coextensive with each other to form an interior between said inside pane of glass and said outside pane of glass;
at least one spacer that is disposed between said inside pane of glass and said outside pane of glass in a peripheral area, said inside pane of glass and said outside pane of glass being substantially aligned so that said inner surface of said inside pane of glass faces an interior portion of said warm window system;
at least two buss bars placed in said interior portion of said warm window system adjacent to said at least one space, said buss bars comprising:
a first base portion that is disposed adjacent to an inside surface of said outside pane;
a second base portion that is disposed adjacent to an inside surface of said outside pane;
a curved contact surface connected to said first base portion and said second base portion that flattens when said buss bar is compressed between said outside pane of glass and said inside pane of glass, said buss bars having a modulus of elasticity that causes said contact surface to be forced against said inner surface of said inside pane of glass, resulting in said contact surface producing a sufficient amount of physical force on said inner surface of said inside pane of glass to create an electrical contact between said contact surface and said conductive layer on said inner surface of said inside pane of glass so that said contact surface is capable of carrying a sufficient current to warm said warm window system, and a sufficient amount of physical force to hold said buss bars in a substantially stationary position in said interior portion of said warm window system.

* * * * *